United States Patent
Wu et al.

(10) Patent No.: US 9,929,803 B1
(45) Date of Patent: Mar. 27, 2018

(54) COMMUNICATION LINK CONTROL USING COMMUNICATION INTERFACE AND PROGRAMMABLE LOGIC CIRCUITRY

(71) Applicant: Altera Corporation, San Jose, CA (US)

(72) Inventors: Hsinho Wu, Santa Clara, CA (US); Mike Peng Li, Palo Alto, CA (US); Masashi Shimanouchi, San Jose, CA (US)

(73) Assignee: ALTERA CORPORATION, San Jose, CA (US)

( * ) Notice: Subject to any disclaimer, the term of this patent is extended or adjusted under 35 U.S.C. 154(b) by 0 days.

(21) Appl. No.: 15/278,211

(22) Filed: Sep. 28, 2016

(51) Int. Cl.
H04B 10/08 (2006.01)
H04B 10/079 (2013.01)
H04L 29/06 (2006.01)

(52) U.S. Cl.
CPC ... *H04B 10/0797* (2013.01); *H04B 10/07955* (2013.01); *H04L 69/18* (2013.01); *H04B 10/07953* (2013.01)

(58) Field of Classification Search
CPC .......... H04B 10/0797; H04B 10/07955; H04B 10/0775; H04B 10/0779; H04B 10/07953; H04B 10/564; H04B 1/0458; H04B 10/07951; H04B 10/07957; H04J 14/0221; H04L 69/18; H03H 7/40; H04W 24/02
USPC .......................... 398/25–28, 37, 38, 158, 162
See application file for complete search history.

(56) References Cited

U.S. PATENT DOCUMENTS

| | | | | |
|---|---|---|---|---|
| 6,885,820 B2 * | 4/2005 | Eder | .................. | H04B 10/0775 398/16 |
| 6,959,149 B2 * | 10/2005 | Bragg | ................. | H04J 14/0221 398/158 |
| 7,123,834 B2 * | 10/2006 | Hullin | .................. | H04B 10/296 398/162 |
| 7,263,286 B2 * | 8/2007 | Peng | .................... | G01M 11/332 356/218 |
| 7,580,634 B2 * | 8/2009 | Takeuchi | ............. | H04B 10/077 398/15 |
| 7,991,363 B2 * | 8/2011 | Greene | .................... | H03H 7/40 455/125 |
| 8,055,129 B2 * | 11/2011 | Butler | ................. | H04J 14/0221 398/160 |
| 8,428,523 B2 * | 4/2013 | Greene | .................... | H03H 7/40 455/125 |
| 8,798,555 B2 * | 8/2014 | Greene | .................... | H03H 7/40 455/125 |
| 9,237,044 B1 * | 1/2016 | Wu | ................... | H04L 25/03019 |

(Continued)

*Primary Examiner* — Hibret Woldekidan
(74) *Attorney, Agent, or Firm* — Fletcher Yoder P.C.

(57) ABSTRACT

Systems and methods related to the configuration of data communication links between electrical devices are described. The methods described may consider power efficiency of the data communication link along with bit error rate, latency, data rate, and other specifications. Methods discussed may lead to changes in the data communication link protocol, use of error correction coding scheme, the power consumption and the selection of features employed by the data communication link. Electronic systems capable of implementing the discussed methods may be incorporated in the circuitry of the electrical devices. Methods discussed may change the configuration the data communication link features during the operation of the electrical devices and/or the data communication link.

20 Claims, 20 Drawing Sheets

(56) References Cited

U.S. PATENT DOCUMENTS

| | | | |
|---|---|---|---|
| 9,374,787 B2* | 6/2016 | de Lind van Wijngaarden | H04W 52/0258 |
| 2002/0126337 A1* | 9/2002 | Uematsu | H04J 14/0201 398/27 |
| 2005/0123295 A1* | 6/2005 | Hullin | H04J 14/0221 398/25 |
| 2007/0003280 A1* | 1/2007 | Sada | H04B 10/077 398/27 |

* cited by examiner

COMMUNICATION LINK CONTROL USING COMMUNICATION INTERFACE AND PROGRAMMABLE LOGIC CIRCUITRY

BACKGROUND

The present disclosure relates to high-speed data communication systems within or between electronic devices such as printed circuit boards, integrated circuits, and programmable logic devices. More specifically, the disclosure relates to systems and methods for data communication systems using a communication interface and programmable logic circuitry.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Many electronic devices, such as mobile phones, computers, automotive electronic, communication systems, and industrial machinery among others, may employ complex electrical circuitry to implement certain functions. Data communication links may exchange data or command signals between this circuitry. Examples of data communication links include optical links, wire links, printed circuit board traces, and radiofrequency (RF) links. With the increase in the speeds and data processing power in electronic devices, performance specifications for the data communication links may also become more stringent, requiring higher data rates and lower latency times.

The performance of a data communication link may be measured by any number of criteria such as response time (e.g. latency), data rate, error level, or power consumption, among others. Usually, tradeoffs may appear between the different performance metrics. For example, the response time of a data communication link may be improved with an increase of power consumption of the link. In another example, an increased in data rate may be achieved, but accompanied by an increase in error level. Furthermore, the performance of the data communication link may be affected by factors such as the type of channel (optical, electrical, wireless, etc.), channel noise level, communication coding, use of error schemes, signal strength, or power employed by transmitter and/or receiver, which may also affect the relationship between the performance criteria.

In some use cases, the power consumption of the communication link plays a less important role as its impact on link performance and cost efficiency may be negligible. In these use cases, the specifications of concern in communication link design may be limited to response time and error rate. For example, mechanisms such as amplitude control, equalization, error detection, correction coding, and the use of optical links may be employed to decrease the response time over a noisy channel. However, these mechanisms may consume significant power, which may be a waste of energy for some use cases that may have less stringent specifications.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure relate to methods and systems that may improve a power efficiency performance of a data communication link. In one embodiment, a method to configure a data communication link between a first electrical device and a second electrical device through a communication channel is disclosed. The first electrical device may have sender circuitry and the second electrical device may have receiver circuitry. The sender circuitry may be configured with a set of sender parameters, the receiver circuitry may be configured with a set of receiver parameters, and the communication channel may be configured with a set of communication parameters, and the configuration of the data communication link may include adjusting the above mentioned parameters. To the end, the method may include steps for acquiring a set of specifications for the data communication link, selecting a data communication link protocol based on the specifications, and selecting an initial configuration for the sender, the receiver, and the data communication link channel based on a link operation target. The method may also include steps for calculating a power-aware figure of merit that may take into account the power efficiency of the data communication link. Based on the power-aware figure of merit calculated, the parameters for the sender, receiver, and/or channel may be adjusted to improve the efficiency of the data communication link.

In another embodiment, a dynamic data communication link is described. The data communication link may include a sender circuitry in a first electrical device, a receiver circuitry in a second electrical device, a communication channel that couples the sender and the receiver circuit, and a data communication link controller component that may configure the sender, the receiver, and/or the channel. To that end, the data communication link controller may include instructions that allow acquisition of a set of specifications for the data communication link, selection of a protocol for the data communication link, selection of parameters for the sender, receiver and channel, calculation of a power aware figure of merit for the data communication link which takes into account the power consumed by the data communication link and adjustment of the set of parameters based on the power aware figure of merit and the link operation target. The acquisition of the set of specifications and the adjustment of the set of parameters may take place during an operation of the data communication link.

In a further embodiment, a data communication link controller is described. The data communication link controller controls a data communication link that may have a sender circuitry in a first electrical device and configured with a set of sender parameters, a receiver circuitry in a second electrical device and configured with a set of receiver parameters and a communication channel coupling the sender and the receiver circuitry, with a set of channel parameters. The data communication link controller may perform the acquisition of specifications for the data communication link, selection of the data communication link protocol used in the data communication link, and a selection of the sender parameters, the receiver parameters, and of the channel parameters according to the specifications of the data communication link and the data communication link protocol selected. Moreover, the data communication link controller may calculate a power aware figure of merit for the data communication link based on a simulation of the data communication link, and adjust the set of sender parameters, receiver parameters and channel parameters based on the power aware figure of merit calculated.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
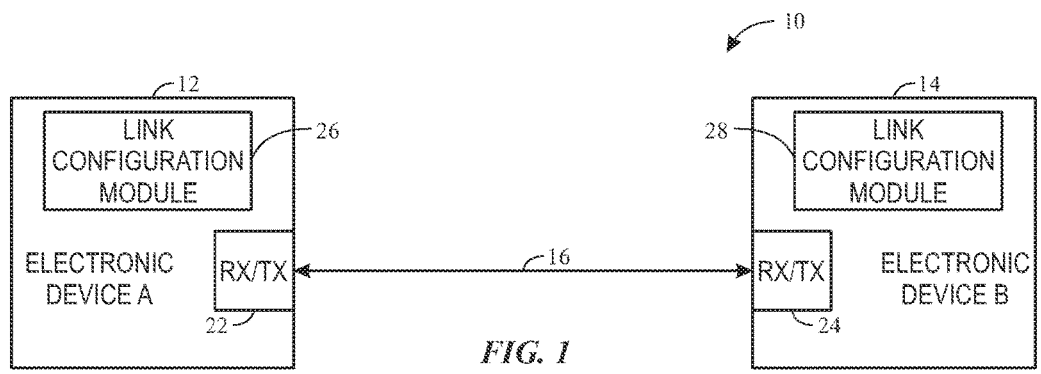
FIG. 1 is a block diagram illustrating a system in which two electronic devices may communicate via a data communication link, in accordance with an embodiment.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Many electrical, electro-mechanical, and electronic systems employ electronic devices to assist their performance. The electronic devices may include integrated circuits that may include a processor, an application-specific integrated circuit (ASIC), a system-on-chip (SoC), a memory device, a radio frequency (RF) communication circuit, and/or a circuitry for a programmable logic device (PLD) such as a field programmable gate array (FPGA), among others. In addition, the electronic devices may also include other circuitry such as a printed circuit board (PCB), silicon bridge, and/or an interposer. The electronic devices may exchange information with other electronic devices within the system, or they may provide an interface for communication between the system and other external devices outside the system. Usually this information exchange may take place through some communication channel, referred to in this disclosure as a data communication link. The electronic devices may have communication interfaces, which may include a transmitter, a receiver, or a transceiver that contains both a transmitter and a receiver. The communication interfaces provide access to data communication links.

Different scenarios may have different specifications for the data communication link. For example, some use cases may have a bandwidth specification, a latency specification, a bit error rate (BER) target, data communication link protocol specification, use of forward error correction (FEC) schemes, a power specification, or other specifications relevant to communication between electronic devices. Moreover, the data communication link may be of different types, such as a wire, a trace, a high frequency coaxial connection, a wireless radio channel, an optical connector, an infrared link, and other suitable methods for communicative coupling between electrical devices. The different types of channel may provide an additional constraint to the specifications. For example, an optical connector may present a higher bandwidth or a lower bit error rate than a printed circuit board trace.

In some use cases, the data communication link may be performing much above the minimum specifications for the connection. In these cases, it may be possible to identify data communication link configurations that may provide adequate performance while consuming less power. For example, adjustments to the amplitude control, equalization, or a phase-locked loop (PLL) of the transmitter, equalization, or clock and data recovery (CDR) component of the receiver, or the coding scheme, error detection schemes, or the error correction schemes of the system may decrease the power consumption while providing an acceptable performance. This may be achieved by incorporating power consumption as part of the specifications or as a component in the evaluation of the data communication link during the design process.

Embodiments described herein describe methods and systems that may provide data communication link configurations that satisfy data communication specifications for bandwidth, latency time, link topology, and power consumption. In some use cases, parameters such as link protocol, equalization power, link settings, coding schemes, and error correction may be adjusted. In some use cases, a forward error correcting (FEC) scheme may also be employed. In some embodiments, the reconfiguration of the parameters for the data communication link may be dynamically implemented in deployed electronic devices. Moreover, the electronic devices may include link configuration components that may perform the methods described to identify the adequate configuration and reconfigure parameters for the data communication link while deployed.

With the foregoing in mind, FIG. 1 illustrates a system 10 that includes a first electronic device 12 and a second electronic device 14, which may exchange information through a communication channel 16. To access the communication channel 16, electronic device 12 may have first transmission/reception circuitry 22 and the electronic device 14 may have second transmission/reception circuitry 24. The transmission/reception circuitry 22 and 24 may have transceivers, error checking components, equalizers, and amplifiers that facilitate the conversion between signals that are appropriate to the channel and digital data to be used by the electronic device. The communication channel 16, along with the transmission/reception circuitry 22 and 24, may form a data communication link between electronic device 12 and electronic device 14.

Electronic devices 12 and 14 may also include link configuration components 26 and 28 respectively. The link configuration components 26 and 28 may be unitary modules or may be distributed among other circuitry of the electronic devices 12 and 14, respectively. The link configuration components 26 and 28 include circuitry that acquires specifications related to the use case, to the transmission/reception circuitry, and to the communication channel 16 to produce a configuration for the data communication link. Upon a change in the specifications, link configuration components 26 and 28 may produce a new configuration for the data communication link, and may reconfigure the transmission/reception circuitry 22 and 24. Note that while the diagram illustrates a data communication link between two electronic devices 12 and 14 that have link configuration components 26 and 28, it should be noted that some embodiments may have systems in which only one of the electronic devices coupled to the data communication link may is provided with a link configuration component. In other embodiments, the identification of a new configuration for the data communication link may take place outside the electronic device. For example, electronic device 12 may reconfigure its transmission/reception circuitry 22 based on a command received by a device external to electronic device 12. Communication channel 16 may include intermediate components, such as repeaters, retimes, optical transmit/receive modules and others components that may assist communication. Methods and systems described herein explores link configurations that may include such or configure these intermediate components.

Figure 2:
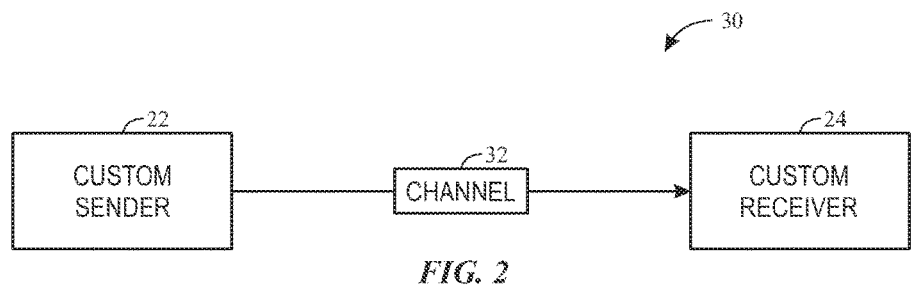
FIG. 2 is a block diagram illustrating a data communication link that includes a sender, a receiver, and a communication channel, in accordance with an embodiment.

The diagram of FIG. 2 illustrates a unidirectional data communication link 30 between a configured sender circuitry 22 and a receiver circuitry 24 through a channel 32. As described above, an use case that is being served by a data communication link 30 may have specifications related to latency, bandwidth, bit error, protocol, channel-related constraints, and power consumption, among others. The specifications may be satisfied by adjustments to parameters related to the sender circuitry 22, such as signal power, data rate, equalization, amplitude control, PLL configuration, and clock configuration, among others. Specifications may also be satisfied by adjustments of parameters related to the receiver circuitry 24, such as equalization, amplification, and the clock-and-data recovery (CDR) circuitry, among others. Moreover, system, and channels characteristics, such as protocol, error detection/correction mechanisms, type of channel, filtering, amplification, use of repeater, use of retimer, and others may be configured to achieve the specifications. Several of the configurations of the systems and parameters described above may lead to an increase in power consumption by the sender circuitry 22, receiver circuitry 24, or channel 32. If a data communication link configuration exceeds the data communication link specification, a power savings may be obtained by reconfiguration of the data communication link, as detailed below.

Figure 3:
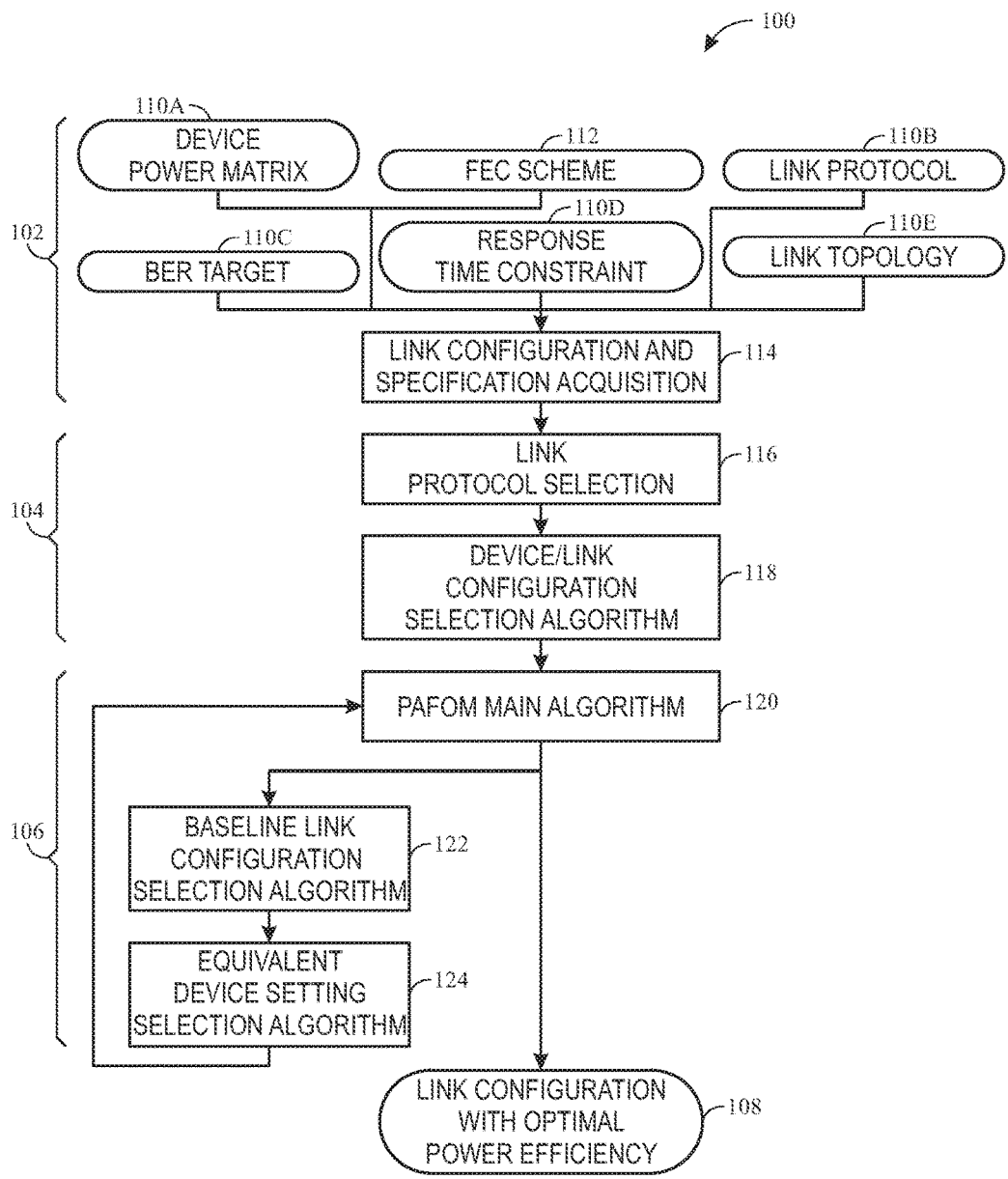
FIG. 3 is a flowchart of a method to obtain a link configuration that satisfies use case specifications with power efficiency, in accordance with an embodiment.

FIG. 3 illustrates a flow chart 100 that may be used to obtain a data communication link configuration that satisfies use case specifications with power efficiency. In some scenarios, the power efficiency may be measured in energy spent per information, e.g. measured in pJ/bit. In other use cases, the power efficiency may be measured in consumed power, e.g. measured in watts. The method may be implemented in a component within an electrical device coupled to the data communication link, or it may be implemented in another system communicatively coupled to the electrical device. The method may be also employed in the design of the electrical device, prior to deployment of the data communication link.

The method illustrated by flow chart 100 may have a block for link specification acquisition 102, a block for determining link configuration and device features 104 and a block to determine link and device settings 106. The block for link specification acquisition 102 may collect specifications for the data communication link. Specifications acquired may include the device power matrix 110A, a desired link protocol 110B, a bit error rate (BER) target 110C, a response time constraint 110D, and a link topology 110E. In some systems, an FEC Scheme 112 may be part of the specification. The specifications for the data communication link may be consolidated (block 114).

The block for determining link configuration and device features 104 may include a method to select the link protocol (block 116) which is based on the consolidated specifications provided in block 114. Based on the link protocol selected in block 116, the devices (e.g., transmitter circuitry, receiver circuitry, channel) and the data communication link may be configured (block 118) to satisfy the specifications. In the block to determine link and device settings 106, the device and link configuration obtained in block 118 may be provided to a power-aware figure-of-merit (PAFOM) system (block 120) which may identify if the configuration is using excessive power. A PAFOM may include measures that take into account power metrics, such as power consumption per bit. The PAFOM may also include link quality measures such as timing and amplitude that allows error-free communication. The PAFOM may be a compounded figure-of-merit that links both types of metrics. For example, the method may configure an error-free (e.g., up to the bit-error rate requirement) link with minimum power consumption. The method may also select the link that provides the best link quality among several settings with similar power consumption configuration. The PAFOM system (block 120) may calculate a PAFOM based on the device and link configuration. Within the PAFOM system, baseline link configuration process (block 122) and equivalent device setting selection process (block 124) may be executed. These processes may provide a link configuration setting that maximizes the PAFOM. Since power consumption of the link may have dependency on multiple device settings, iteration loop among blocks 120, 122, and 124 may be employed until a power efficient link configuration 108 is identified.

Figure 4:
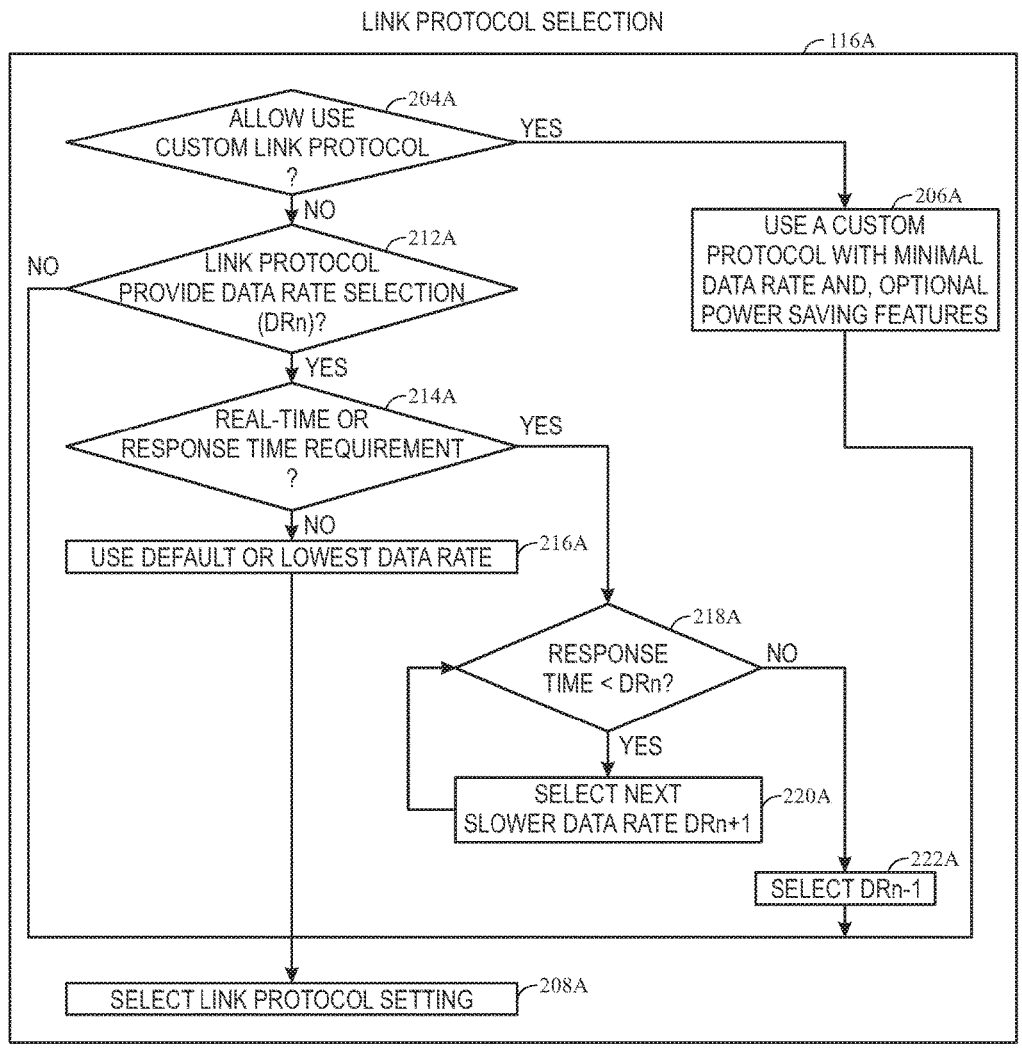
FIG. 4 is a flow chart of a method to choose a link protocol that may be used to assist the method of FIG. 3, in accordance with an embodiment.

With the foregoing in mind, aspects of method illustrated by flow chart 100 will follow. FIG. 4 illustrates a method 116A to select a link protocol for the data communication link. To that end, the data communication link specification is checked to verify if a custom link protocol may be used or if the specification determines the link protocol (block 204A). If a custom link protocol may be used, a custom protocol with the smallest data rate prescribed in the specification may be employed (block 206A). This protocol may be chosen from a list of protocols available to the system performing the method 116A. Custom protocols with additional power saving features may be chosen. The custom link protocol setting may be then provided (block 208A). Alternatively, if the specification prescribes a specific link protocol, a determination is made on whether the specified link protocol provides a choice for data rate selection (block 212). For example, a PCIe protocol may specify different channel speeds. If there is no data rate to be chosen, the link protocol from the specification is selected (block 208A).

If there is flexibility in the link protocol with respect to the data rate selection (i.e., if the specified link protocol allows for choice of data rates), a determination is made on whether the use case has a real-time or a response-time specification (block 214A). If there is no such requirement, a default or the lowest data rate may be selected (block 216A) and the link protocol setting may be provided (block 208A). However, if there is a real-time or a response time specification, the method may identify whether the response time specified is smaller than the highest data rate (block 218A).

If the response time is smaller than the data rate, a link protocol setting with a slower data rate may be chosen (block 220A) and compared with the response time (block 218A). The loop that may involve blocks 218A and 220A continues until a link protocol data rate that is smaller or equal to the required response time is identified (block 218A). The link protocol with a data rate that immediately preceded the last data rate tested in block 218A is selected in block 222A to obtain the slowest data rate for the link protocol that satisfied the real-time or response specification. The link protocol setting is provided in block 208A.

Figure 5:
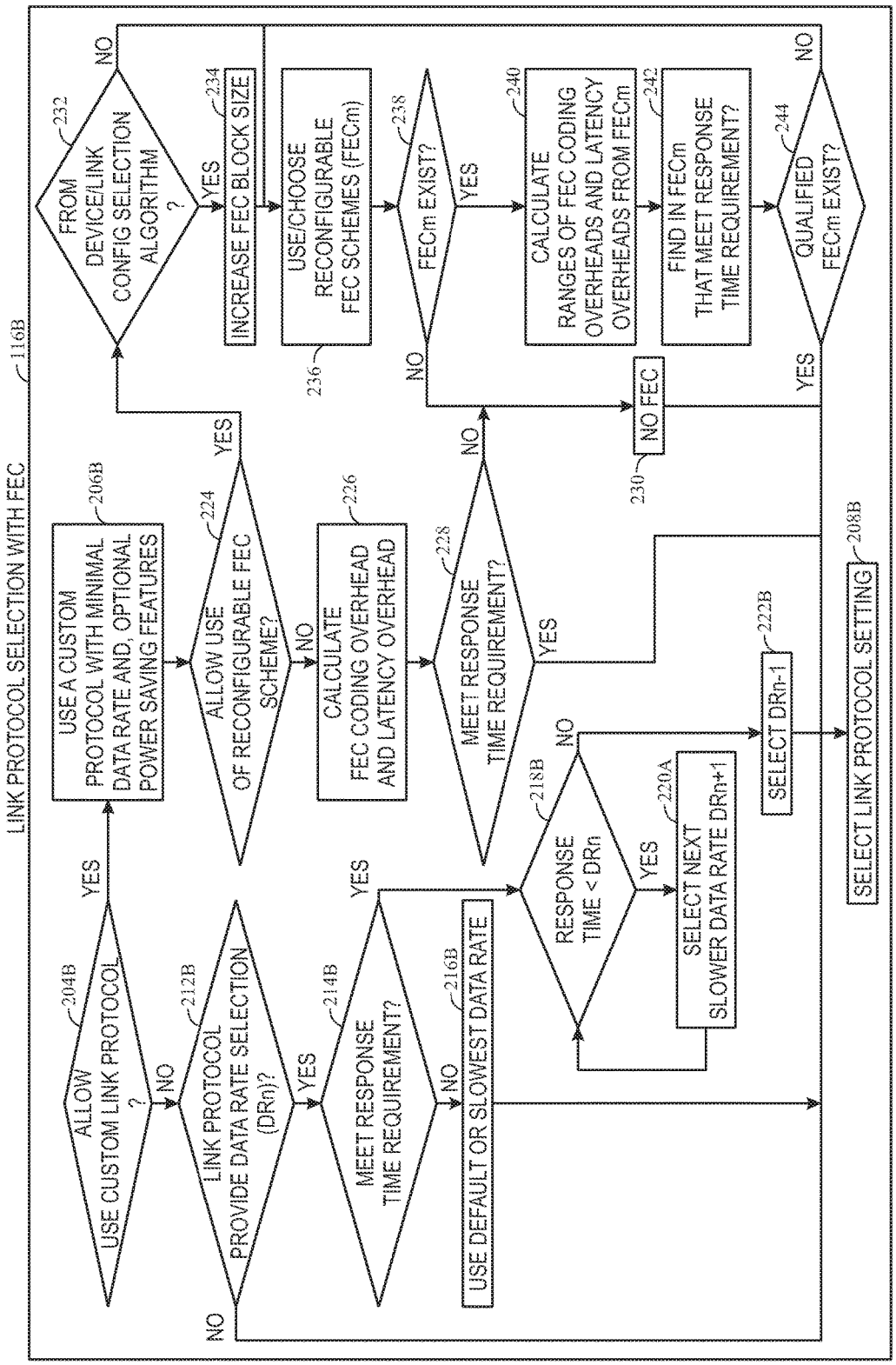
FIG. 5 is a flow chart of a method to choose a link protocol that may employ a forward error correction (FEC) scheme and may assist the method of FIG. 3, in accordance with an embodiment.
Figure 6A:
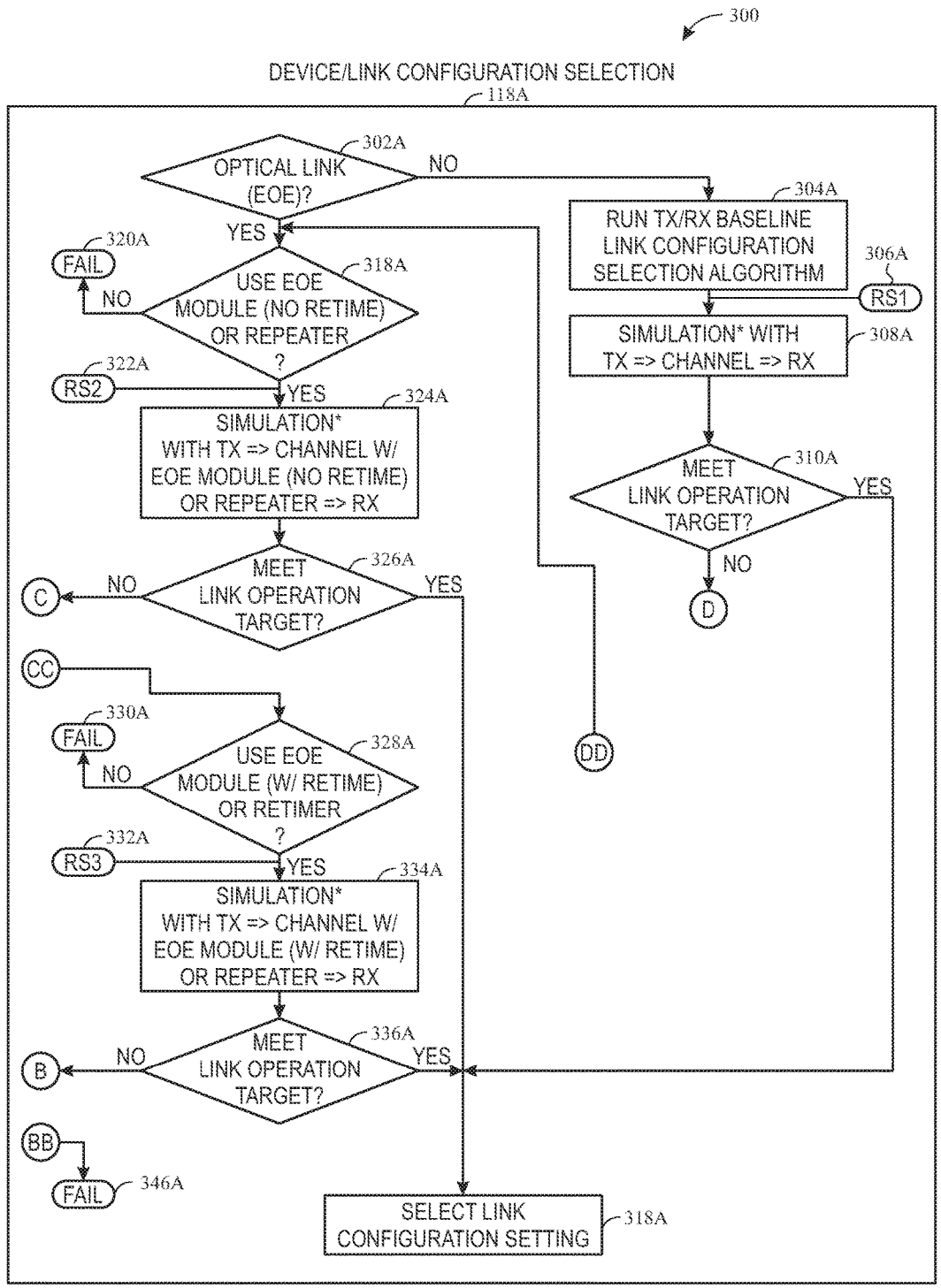
FIG. 6A illustrates a flow chart of a method to configure a device and/or a link that may be used to assist the method of FIG. 3, in accordance with an embodiment.
Figure 6B:
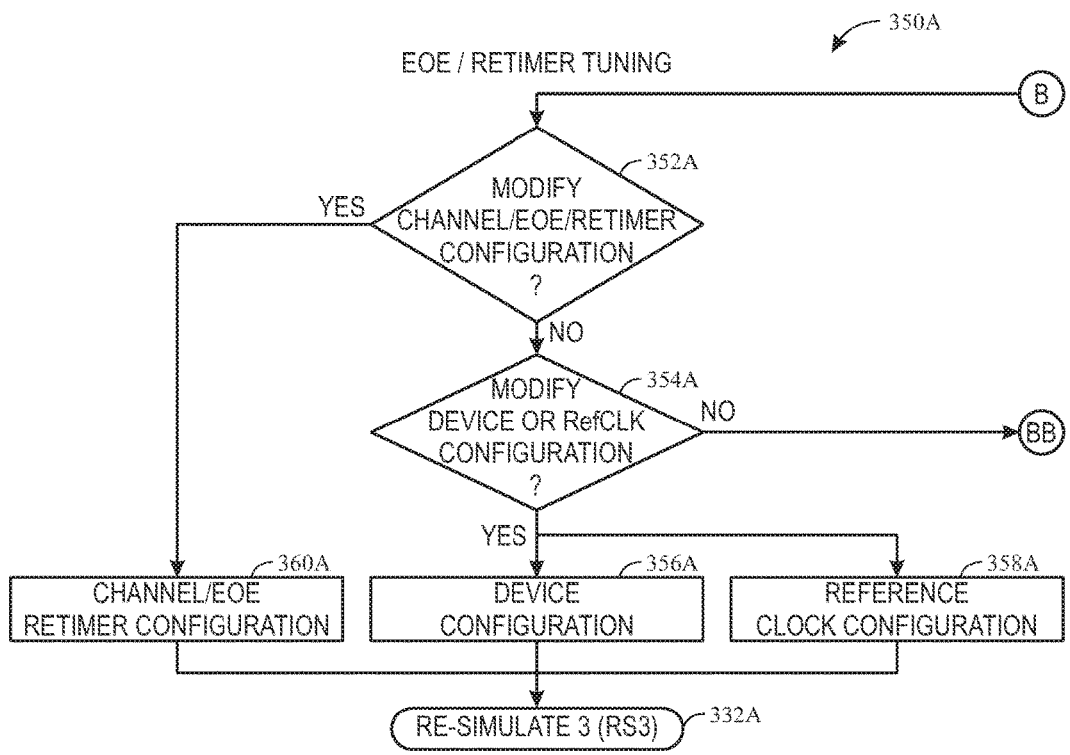
FIG. 6B illustrates a flow chart of a method to configure a device and/or a link that may be used to assist the method of FIG. 3 and is connected to the flow chart of FIG. 6A, in accordance with an embodiment.
Figure 6C:
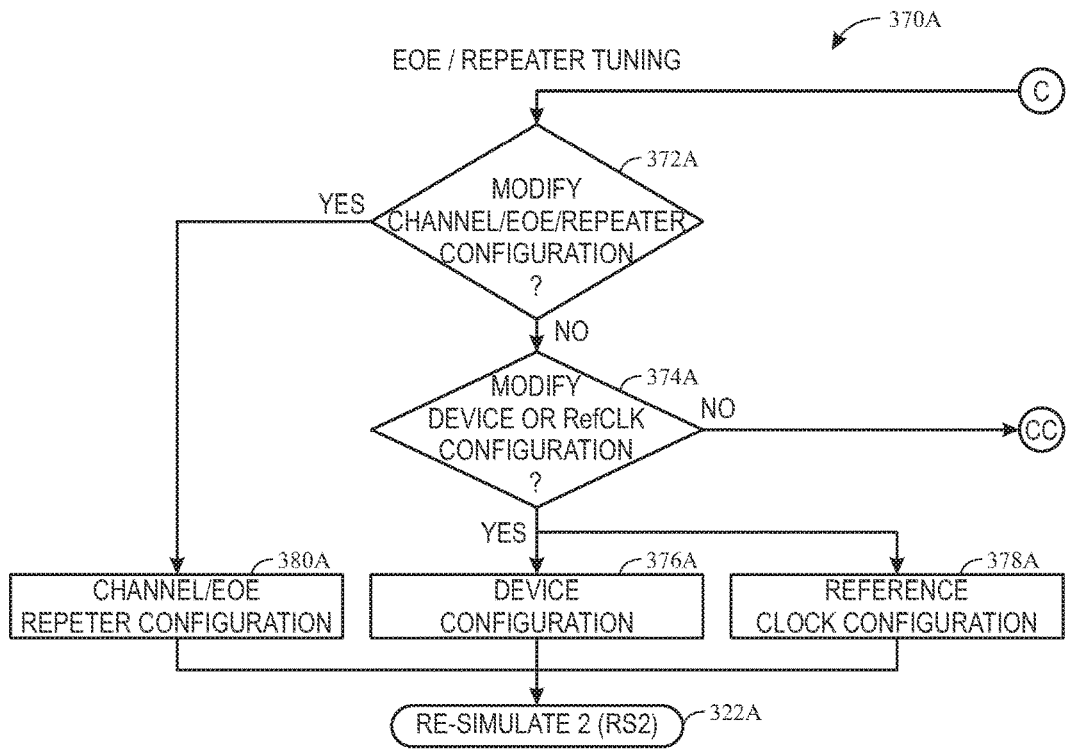
FIG. 6C illustrates a flow chart of a method to configure a device and/or a link that may be used to assist the method of FIG. 3 and is connected to the flow chart of FIG. 6A, in accordance with an embodiment.
Figure 6D:
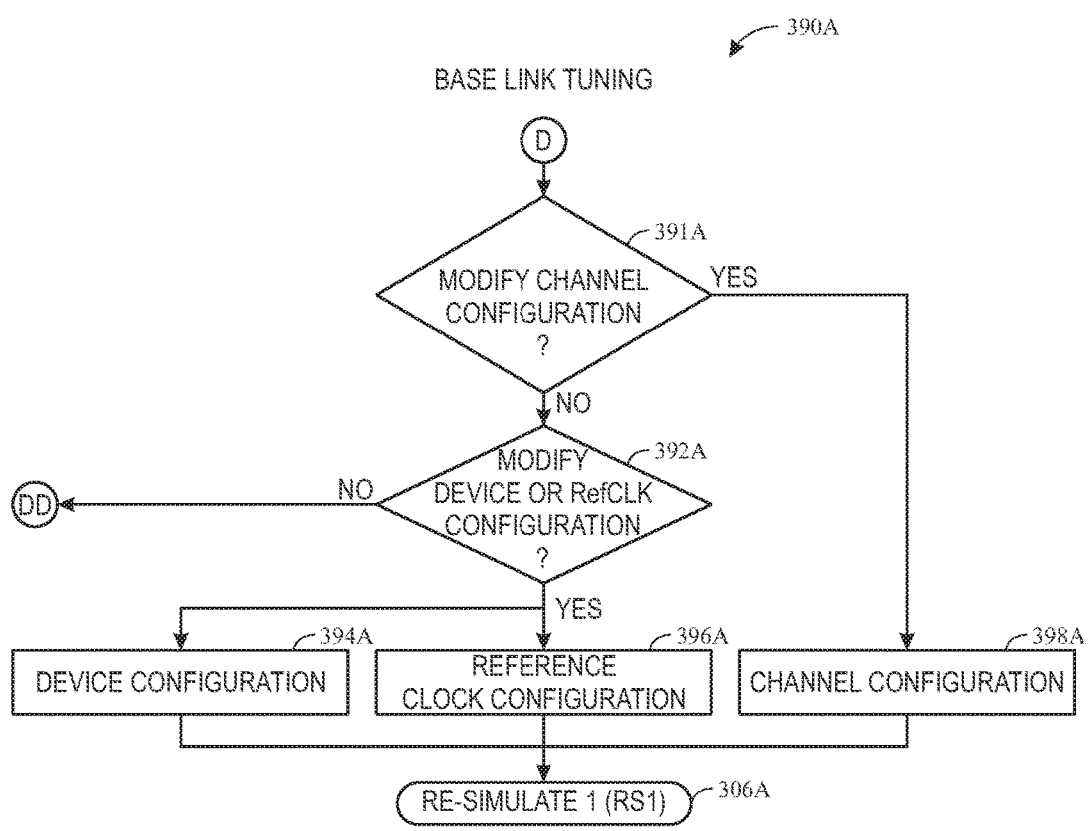
FIG. 6D illustrates a flow chart of a method to configure a device and/or a link that may be used to assist the method of FIG. 3 and is connected to the flow chart of FIG. 6A, in accordance with an embodiment.
Figure 7A:
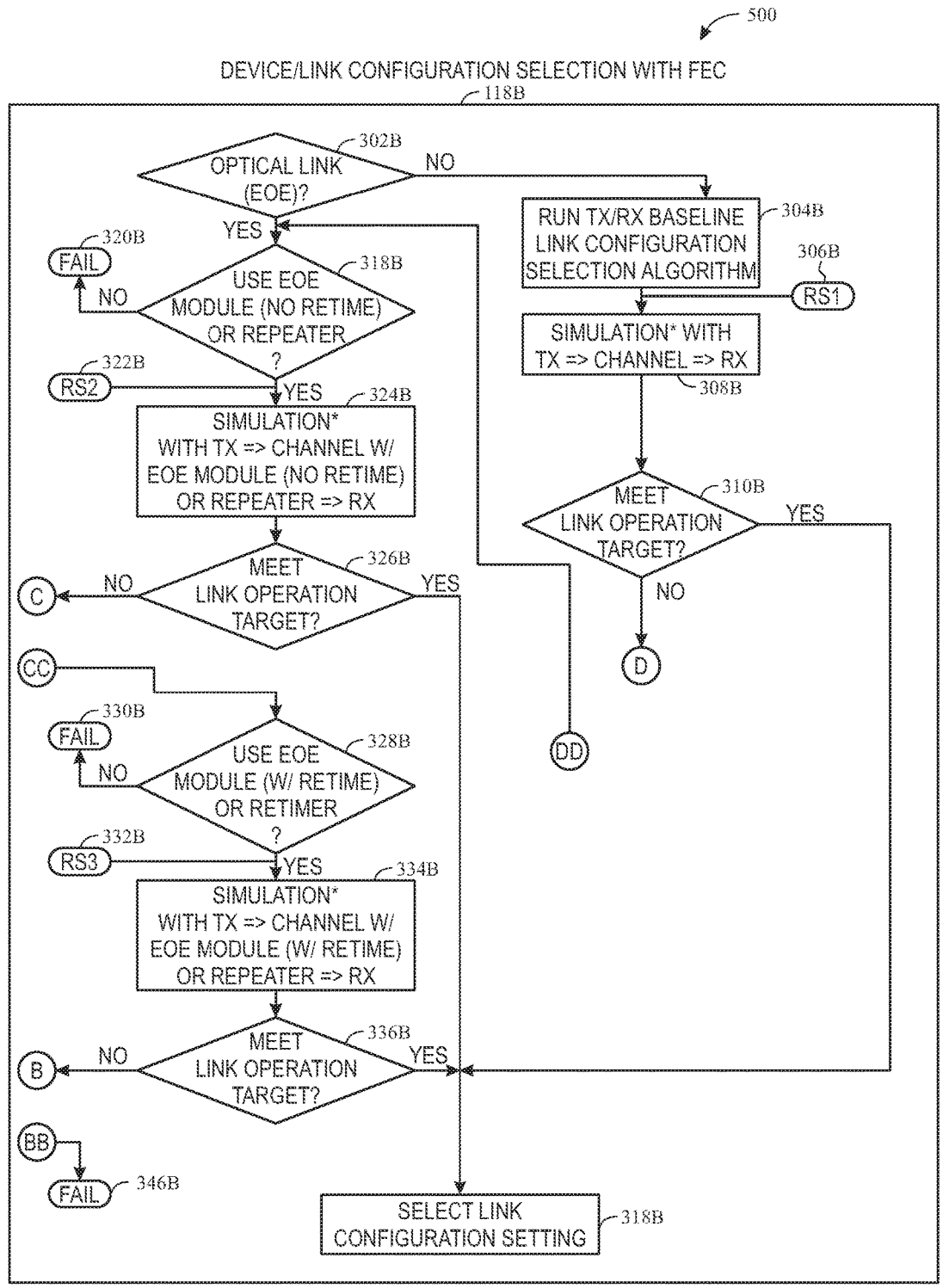
FIG. 7A illustrates a flow chart of a method to configure a device and/or a link that may employ an FEC scheme, and may assist the method of FIG. 3, in accordance with an embodiment.
Figure 7B:
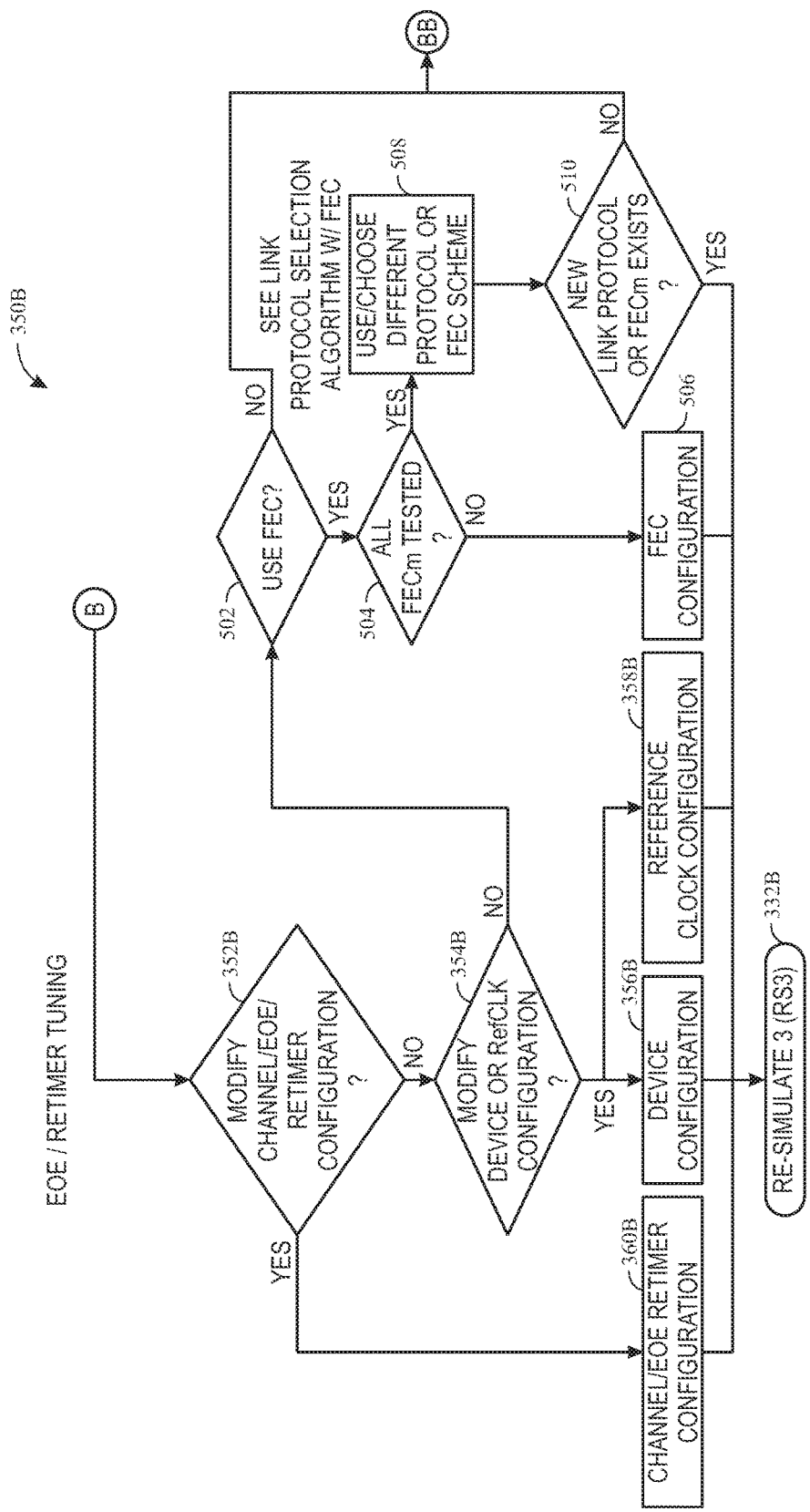
FIG. 7B illustrates a flow chart of a method to configure a device and/or a link that may employ an FEC scheme, may assist the method of FIG. 3, and is connected to the flow chart of FIG. 7A, in accordance with an embodiment.
Figure 7C:
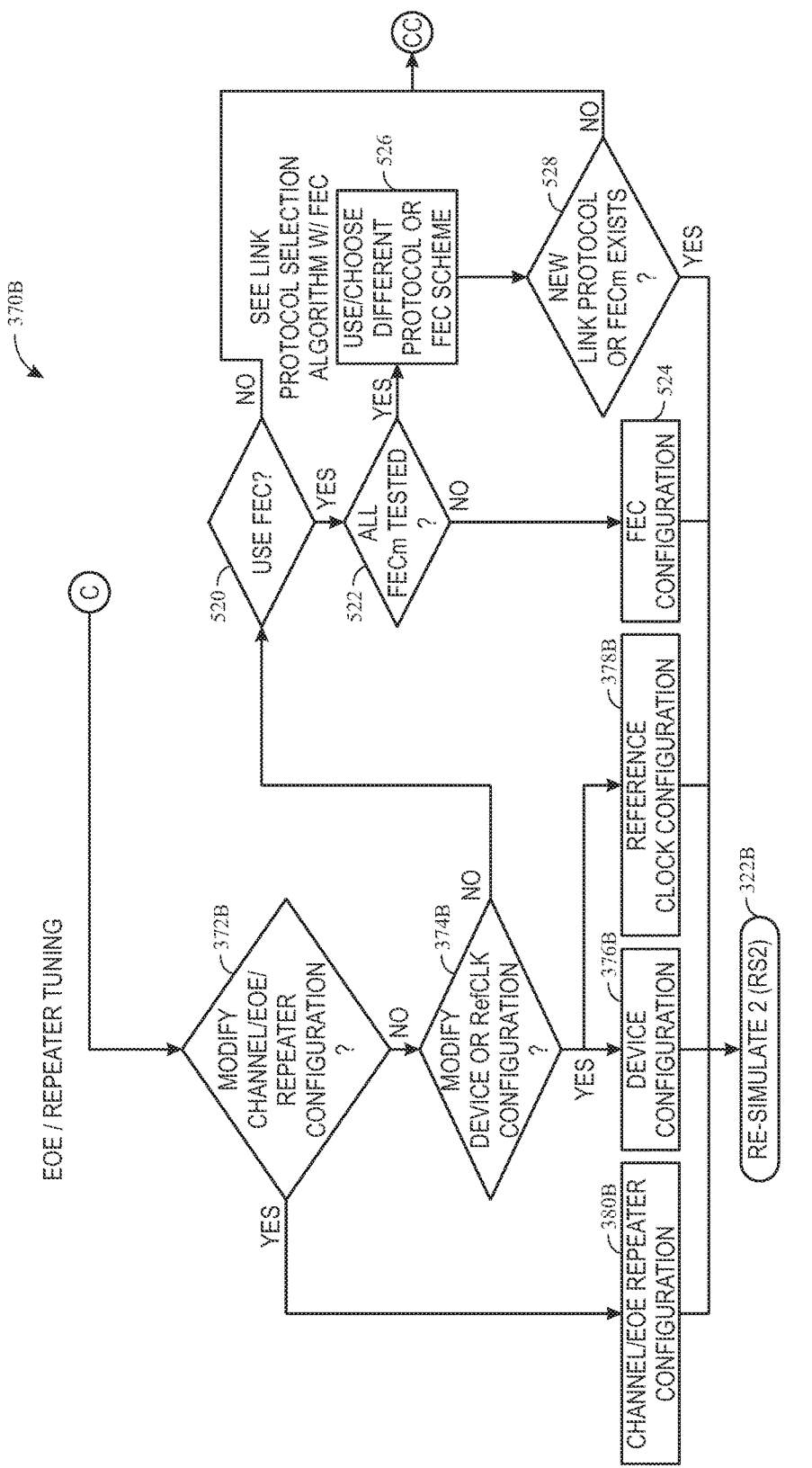
FIG. 7C illustrates a flow chart of a method to configure a device and/or a link that may employ an FEC scheme, may assist the method of FIG. 3, and is connected to the flow chart of FIG. 7A, in accordance with an embodiment.
Figure 7D:
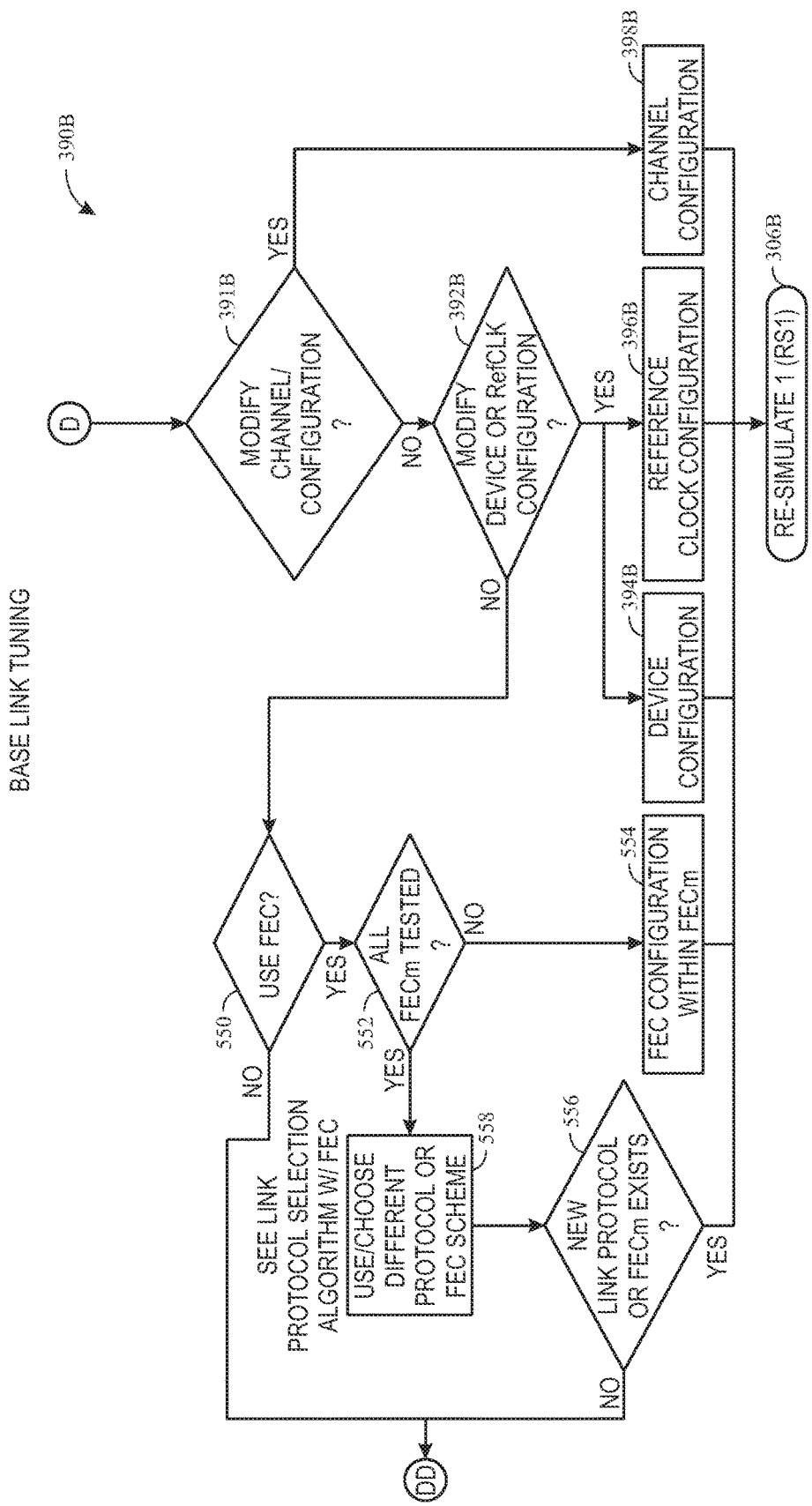
FIG. 7D illustrates a flow chart of a method to configure a device and/or a link that may employ an FEC scheme, may assist the method of FIG. 3, and is connected to the flow chart of FIG. 7A, in accordance with an embodiment.

FIG. 5 illustrates a method 116B that may be applied to select a link protocol when an FEC scheme may be used. Note that several elements of the method 116B may be similar to elements of the method 116A such as blocks 204B, 208B, 212B, 214B, 216B, 218B, 220B, and 222B, which may be similar to blocks 204A, 208A, 212A, 214A, 216A, 218A, 220A, and 222A respectively. In the method 116B, if a custom protocol may be used (block 204B) a custom protocol with smallest allowed data rate, and with optional saving features may be chosen (block 206B). A determination is made on whether a reconfigurable FEC scheme may be used with the custom protocol (block 224). If reconfigurable FEC is not available, an overhead for the FEC coding and FEC latency may be directly calculated (block 226). If the overhead satisfies the response time specification (block 228), as calculated from the data rate, the FEC scheme is used in the final link protocol setting provided (block 208B). Otherwise, FEC may not be used in the link (block 230) and the link protocol selection process is completed (block 208B).

In the case a reconfigurable FEC scheme is allowed (block 224), the method determines if the reconfigurable FEC scheme is from the device/link configuration selection method (block 232 and block 500). If yes, the block size may be increased (block 234). The method then searches for reconfigurable FEC schemes (FECm) (block 236). If reconfigurable schemes do not exist (block 238), the FEC feature is disabled (block 230) in the link protocol setting provided (block 208B). If reconfigurable schemes exist (block 238), ranges of overhead from FEC coding and FECm latency are calculated (block 240). If there is a reconfigurable FEC scheme in FECm that meets the response time specification (blocks 242 and 244), then the link protocol setting with the appropriate setting is provided (block 208B). If a qualified FECm does not exist (block 244), the system may try to identify an alternative FEC scheme (block 236). If no other FEC scheme is available (block 238) the FEC feature is disabled (block 230) in the link protocol setting provided (block 208B).

FIGS. 6A, 6B, 6C, and 6D illustrate a flow chart 300 of a method 118A to select a configuration for the data communication link and for the devices associated with the data communication link. At a block 302A, a determination is made on whether the data communication link employs an optical link (block 302A). If an optical link is not employed, a baseline link configuration selection step, detailed below, may be performed (block 304A). A simulation of the transmission of data from a sender to a receiver via a channel is performed (block 308A). This simulation assumes that the data communication link does not employ a repeater component or a retimer component. If the simulation shows that the data communication link meets the link operation target (block 310A), then the link configuration may be selected (block 318A). The link operation target may be calculated in a process detailed below. Otherwise, the base link tuning step 390A illustrated in FIG. 6D may be employed. If the channel configuration may be modified in order to achieve the link operation target (block 391A), the channel is reconfigured (block 398A) and the system is re-simulated (306A and 308A) and tested to verify if link operation target is being met (block 310A). The loop that may include blocks 306A, 308A, 310A, 391A and 398A may continue until the link operation target is met (block 310A) or until no further modification in the channel configuration is possible (block 391A).

If the channel configuration may not be modified (block 391A), the system performing method 118A may determine whether the device configuration or the reference clock configuration may be modified (block 392A). If either is true, the device may be reconfigured (block 394A) or the reference clock may be reconfigured (block 396A). The data communication link may be re-simulated (block 306A and 308A) to verify if the link operation target is being met (block 310A). This loop, similar to the loop described with respect to the channel configuration, may proceed until the link operation target is met (block 310A), or until no modification to the channel configuration (block 391A) or to the device or reference clock configuration (block 392A) is available. If the link operation target was met (block 310A), the link configuration setting is selected (block 318A). Otherwise, method 118A proceeds to include a repeater component or an EOE component without retime.

A determination is made on an availability of an electrical-optical-electrical (EOE) component without retime or of a repeater component. If these are not available, the method 118A reaches a fail point (block 320A). A simulation may be performed with an EOE component without retime or with a repeater (block 324A). If the configuration of the data communication link meets the link operation target at this stage (block 326A), the link configuration setting may be selected (block 318A). Otherwise, a process that may involve the EOE/repeater tuning 370A, illustrated in FIG. 6C, may be performed. An assessment on whether the channel, EOE, or repeater may be reconfigured (block 372A). If yes, the reconfiguration is performed (block 380A), the data communication link is simulated (blocks 322A and 324A), and the link operation target may be checked (block 326A). A loop between simulation (blocks 322A and 324A) and reconfiguration of the channel, EOE, or repeater (block 380A) may be performed until the link operation target is met (block 326A) or no further modification of channel, EOE, or repeater is available (block 372A). If the target is met, the link configuration setting may be selected (block 318A).

If no further reconfiguration of channel, EOE, or repeater is available, the method verifies if the device configuration or the reference clock configuration can be modified (block 374A). If so, the device may be reconfigured (block 376A) and/or the reference clock may be reconfigured (block 378A). The data communication link may be simulated (blocks 322A and 324A) to verify if the link operation target with the new configuration is met (block 326A). The reconfiguration of the channel, EOE or repeater (block 380A), reconfiguration of the device (block 376A), and reference clock configuration (block 378A) may be repeated iteratively in a loop with simulation (blocks 322A and 324A) and verification of the link operation target (block 326A) until the link operation target is met (block 326A) or no further modification is available. If the link operation target is met, the link configuration setting may be selected (block 318A).

If the EOE/repeater tuning 370A was not capable of providing a setting that meets link operation target (block 374A), the method verifies if the data communication link may use an EOE component with retime (or an EOE component with clock data recovery (CDR) circuitry) or a retimer component (328A). If these are not available, the method 118A reaches a fail state 330A. If yes, a simulation of the data communication link with a channel that includes an EOE component with retime or a repeater component is performed (block 334A) and the results are compared to the link operation target. If the system satisfies the link operation target, the link configuration setting may be selected (block 318A). Alternatively, an EOE/retimer tuning 350A may be employed to obtain a setting that meets link operation target.

In the EOE/retimer tuning 350A, the method initially checks whether the channel, EOE, or retimer may be reconfigured (block 352A). If yes, the channel, EOE, or retimer is reconfigured (block 360A), a new data communication link simulation is performed (blocks 332A and 334A) and the result is compared with a link operation target (block 336A). A loop between simulation (blocks 332A and 334A) and reconfiguration of the channel, EOE, or repeater (block 360A) may be performed until the link operation target is met (block 336A), or no further modification of channel, EOE, or retimer is available (block 352A). If the link operation target is met (block 336A), the link configuration setting may be selected (block 318A).

If the modification of channel, EOE, or retimer is not available, the method verifies if the device configuration or the reference clock configuration can be modified (block 354A). If so, the device is reconfigured (block 356A) and/or the reference clock is reconfigured (block 358A) and the system may simulated (blocks 332A and 334A) to verify if the link operation target is met (block 336A). The reconfiguration of the channel, EOE or repeater (block 360A), reconfiguration of the device (block 356A), and reference clock configuration (block 358A) may be repeated iteratively in a loop with simulation (blocks 332A and 334A) and verification of the link operation target (block 336A) until the link operation target is met (block 336A) or no further modification is available. If no further reconfiguration (blocks 352A and 354A) is available, the method reaches a fail state (block 346A). If the link operation target is met, the link configuration setting may be selected (block 318A).

In embodiments where the device and link configuration may employ an FEC scheme, the method 118A for device and link configuration selection may be modified to accommodate the flexibility provided by the use of FEC. FIG. 7 illustrates a method 118B to select device and link configurations in a data communication link using an FEC scheme. Some steps of method 118B may be similar to steps of method 118A. As such, similarly numbered steps in flow chart 500 of FIG. 7 may be similar to the corresponding steps in flow chart 300 of FIG. 6.

Note, however, that a Base Link Tuning 390B may be modified if an FEC scheme may be used. During Base Link Tuning 390B, a loop in which reconfiguration of the channel (block 398B), the reference clock (block 396B) or the device (block 394B) followed by a simulation (blocks 306B and 308B) and comparison with a link operation target (block 310B) may be similar to the corresponding loop illustrated in 390A. However, if there is no further modification to the channel (block 391B) nor to the device or reference clock (392B), the Base Link Tuning 390B may attempt to reconfigure the FEC scheme to meet a link operation target. If no FEC scheme is employed (block 550) the base link tuning may exit, but if an FEC scheme may be used (block 550), the system may attempt to employ one (block 558) until all the possible FEC schemes available (block 556) have been tested (block 552). Note that, as before, each FEC scheme configuration may be tested via a loop that may include simulation of the data communication link (blocks 306B and 308B) and verification (block 310B). If the link operation target is met (block 310B), the link configuration setting may be provided (block 318B).

Note, further, that the EOE/Repeater Tuning 370B may be modified if an FEC scheme is used. During EOE/Repeater Tuning 370B, a loop in which reconfiguration of the channel, EOE, or Repeater (block 380B), the reference clock (block 378B) or the device (block 376B) followed by a simulation (blocks 322B and 324B) and comparison with a link operation target (block 326B) may be similar to the corresponding loop illustrated in 370A. However, if there is no further modification to the channel, EOE, or repeater (block 372B) nor to the device or reference clock (374B), the EOE/Repeater Tuning 370B may attempt to reconfigure FEC to meet the link operation target.

If no FEC scheme is employed (block 520) the EOE/Repeater tuning may exit, but if an FEC scheme may be used (block 520), the system may attempt to employ one (block 526) until all the possible FEC schemes available (block 522) have been verified (block 528). Note that, as before, each FEC scheme configuration may be tested via a loop that may include a simulation of the data communication link (blocks 332B and 334B) and verification (block 326B). If the link operation target is met (block 326B), the link configuration setting may be provided (block 318B).

The EOE/Retimer Tuning 350B may also be modified if an FEC scheme is used. During EOE/Retimer Tuning 350B, a loop in which reconfiguration of the channel, EOE, or Retimer (block 360B), the reference clock (block 358B) or the device (block 356B) followed by a simulation (blocks 332B and 334B) and comparison with a link operation target (block 336B) may be similar to the corresponding loop illustrated in 350A. However, if there is no further modification to the channel, EOE, or repeater (block 352B) nor to the device or reference clock (354B), the EOE/Retimer Tuning 350B may attempt to reconfigure the FEC scheme to meet the link operation target.

If no FEC scheme is employed (block 502) the EOE/Retimer tuning may exit, but if an FEC scheme may be used (block 502), the system may attempt to employ one (block 508) until all the possible FEC schemes available (block 510) have been verified (block 504). Note that, as before, each FEC scheme configuration may be tested via a loop that may include simulation of the data communication link (blocks 332B and 334B) and verification (block 336B). If the link operation target is met (block 336B), the link configuration setting may be provided (block 318B).

In methods 118A and 118B illustrated in FIGS. 6 and 7, respectively, simulation of the data communication link was employed in order to obtain data that may be used to verify if the data communication link satisfies use case specifications or if it meets a link operation target. In some implementations, a simulation may be replaced by a live measurement using an Eye Monitor in a receiver device. In other simulations, the data communication link may be configured and measured by an Eye Monitor within a receiver device.

Figure 8:
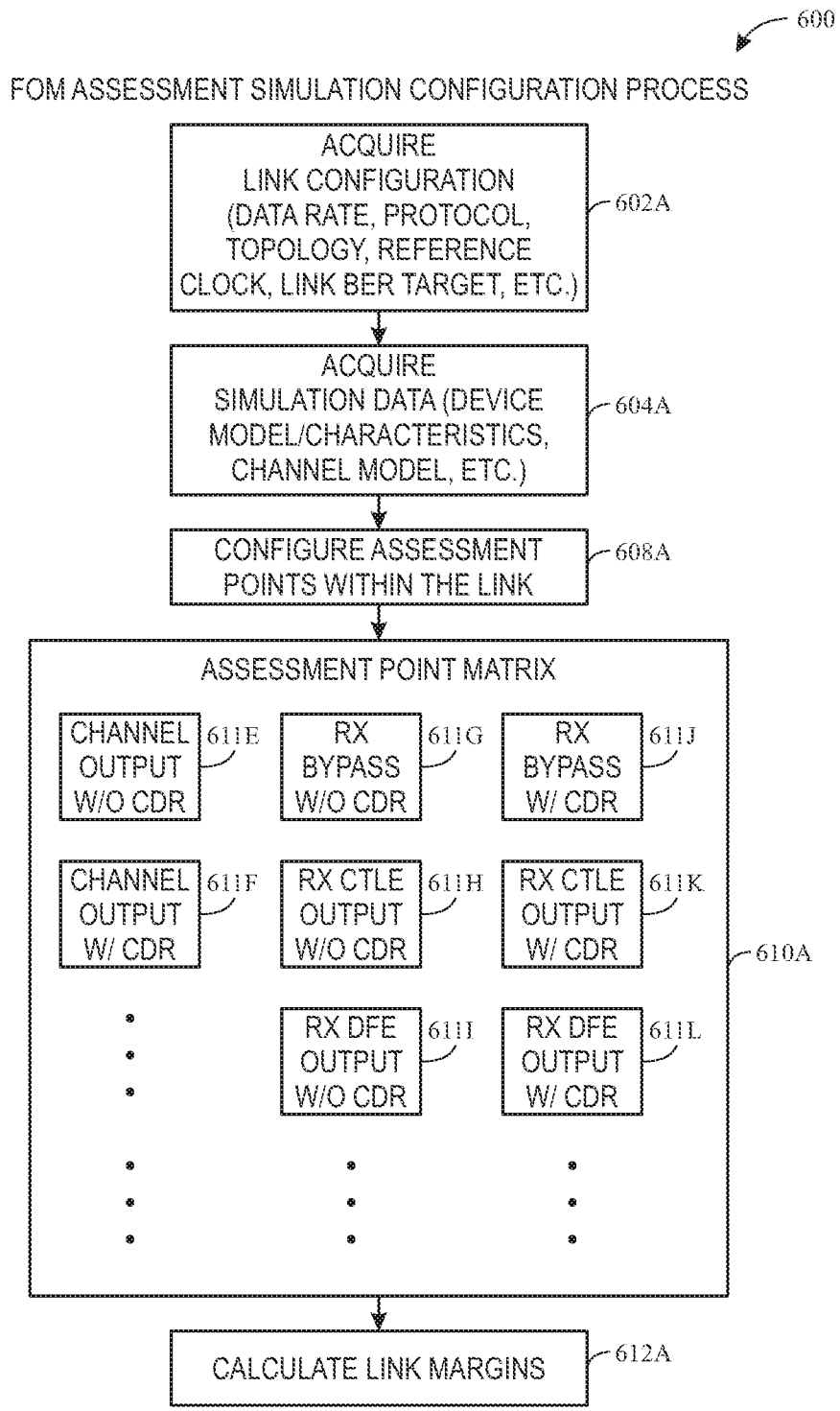
FIG. 8 is a flow chart of a method to determine assessment-point figures-of-merit (APFOM) within the link, and may assist the method of FIG. 6, in accordance with an embodiment.

As discussed above, simulation of the data communication link may be verified against a link operating target. To that end, processes that assess figures of merit at specific points of the data communication link may be useful. Such process may be implemented in a general purpose computer, or in a link configuration component within the electronic device. FIG. 8 illustrates a process 600 to configure the FOM assessment simulation in systems that do not employ an FEC scheme. Configuration of the data communication link being simulated may be acquired (block 602A). Moreover, data related to the physical modeling the of devices, the channel, or other relevant data for simulation may be acquired (block 604A). Assessment points within the data communication link (e.g. sender, transceiver, repeater, receiver, retimer, etc.) may be chosen (block 608A). An assessment point matrix (block 610A) which includes characteristics related to different figures of merit (block 611A-L) may be evaluated at each assessment point. For each characteristic FOM evaluated at each assessment point, a margin may be calculated as a difference between a FOM of the specification and the evaluated FOM (block 612A).

Figure 9:
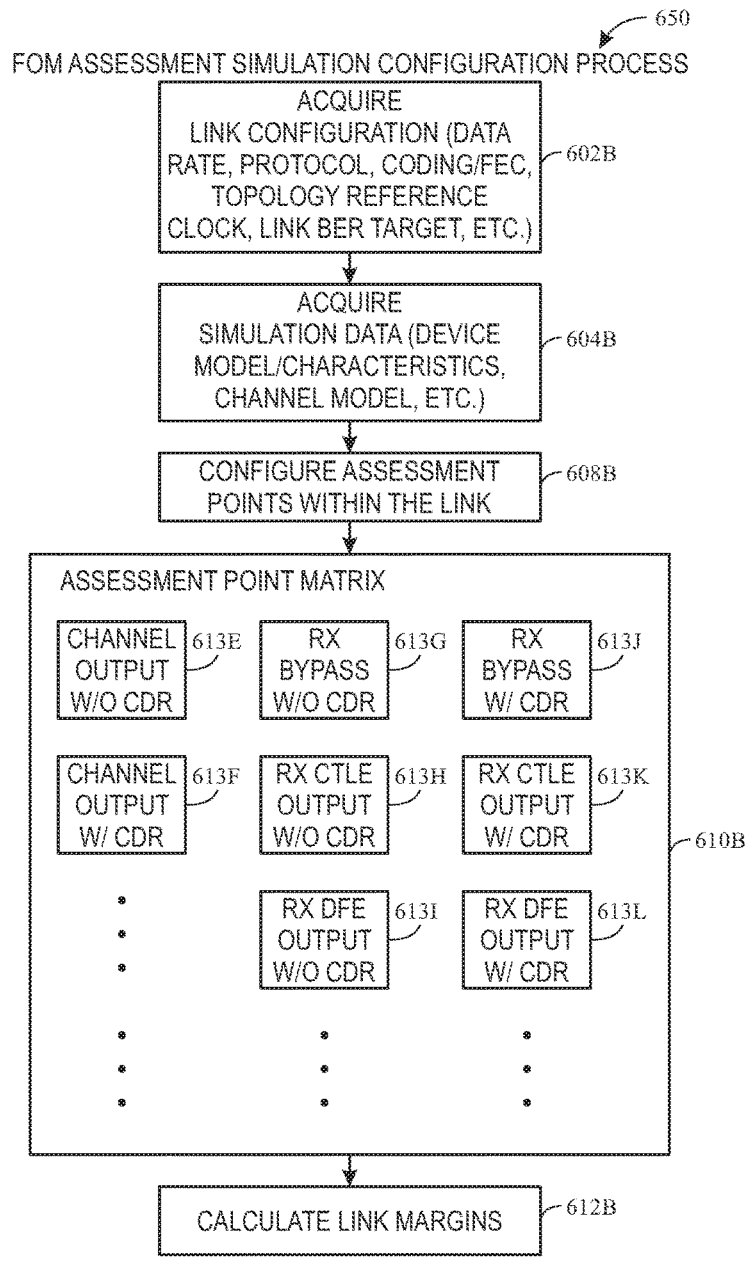
FIG. 9 is a flow chart of a method to determine assessment-point figures-of merit (APFOM) within the link that may employ an FEC scheme, and may assist the method of FIG. 7, in accordance with an embodiment.
Figure 10:
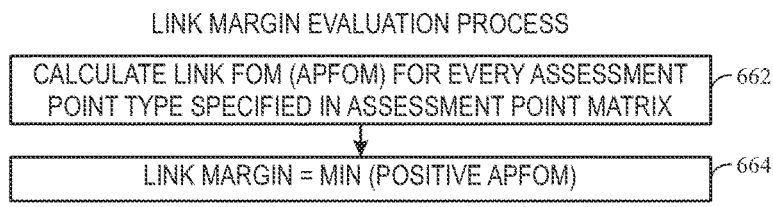
FIG. 10 is a flow chart of a method to evaluate a link margin from APFOM, and may facilitate methods illustrated in FIGS. 6 and 7, in accordance with an embodiment.

FIG. 9 illustrates a process 650 to configure the FOM assessment simulation in systems that employ an FEC scheme. Process 650 may substantially similar to process 600 of FIG. 8, and similarly numbered steps in process 650 may be substantially similar to the corresponding steps in process 600. Note that the use of FEC schemes may increase the complexity of link configuration acquisition (block 602B), and change the relevant characteristic FOM (blocks 613A-L) of the assessment point matrix (FIG. 610B) may vary to evaluate the effects of the FEC scheme. The FOM assessment simulation may also be performed using on-die instrument such as an eye monitor in a receiver device for end-of-link margin measurement and/or stand-alone instruments such as oscilloscopes positioned in intermediate test points.

Note further that methods 118A and 118B illustrated in FIGS. 6 and 7, respectively, include steps in which a link margin for each assessment point resulting from a simulation may be compared with corresponding target link margins to produce assessment point figures of merit (APFOM). An APFOM is a figure-of-merit measured at potential link locations such as a channel output, a CTLE output, a DFE output. This arrangement provides the opportunity to choose a configuration that provides smaller power consumption.

Figure 11:
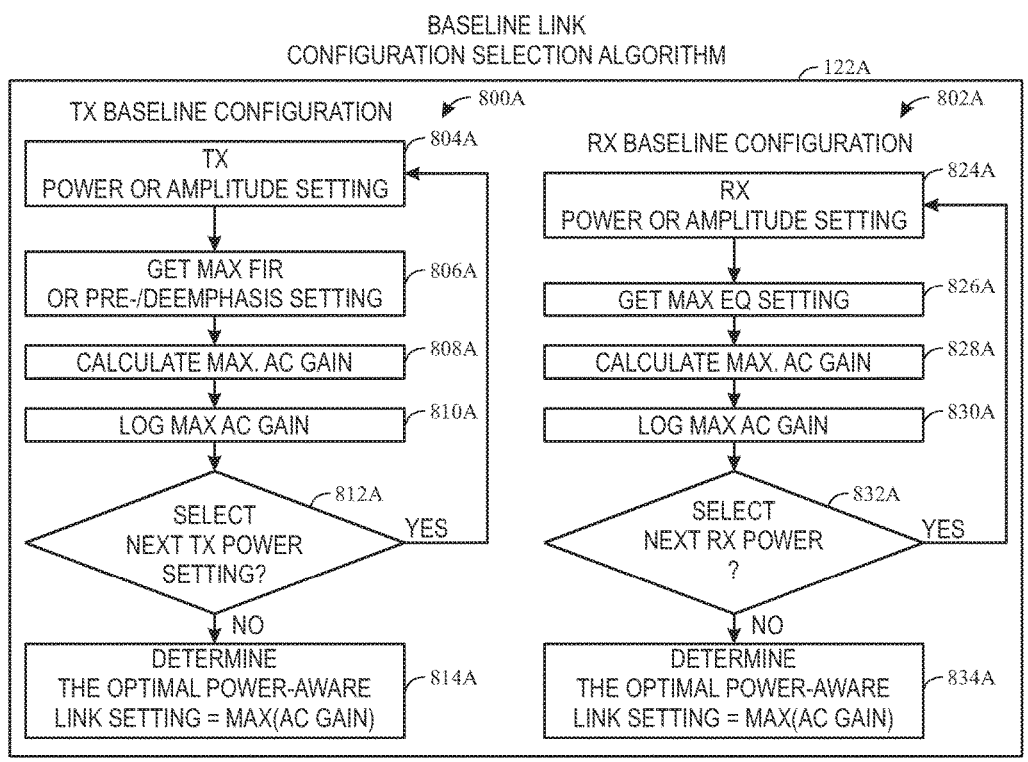
FIG. 11 is flowchart of a method to select a baseline link configuration, in accordance with an embodiment.

For example, if the channel is equalized by a CTLE, which consumes less power than a DFE, and the channel meets link quality requirements, the APFOM will reflect this factor. In this example, the APFOM may lead to a choice of a CTLE-only configuration. A consolidated link margin from the multiple APFOMs resulting from simulations (blocks 612A of FIGS. 8 and 612B of FIG. 9). FIG. 11 illustrates a method 660 to obtain a link margin. A link margin for each assessment point type of the assessment point matrix (610A of FIGS. 8 and 610B of FIG. 9) may be calculated (block 662). From the set of link margins, a consolidated link margin equal to the largest positive link margin obtained may be provided (block 654). Other methods may be used to consolidate the link margin from the APFOMs.

FIG. 11 illustrates a method 122A to select a baseline link configuration, which may assist a method to configure the device and data communication link such as method 118A of FIG. 6. The method may have a process 800A to determine a baseline configuration for the transmitter circuitry. To that end, a setting for transmission power or amplitude may be identified (block 804A). This setting may be based on power consumption specifications. A maximum finite impulse response (FIR) corresponding to the identified transmission settings may be obtained (block 806C) and a corresponding maximum AC gain may be calculated (block 808A). The resulting AC gain value calculated may be logged (block 810A). If there are more power settings to be evaluated (block 812A), a loop that may include blocks 804A, 806A, 808A, 810A, and 812A may be repeated until the maximum AC gains for all power settings of interest are calculated. Based on the logged maximum AC gains, a link setting that provides the largest AC gain may be determined as an optimal power-aware data communication link setting.

The method 122A may also include process 802A to provide a baseline configuration for the receiver. To that end, an initial setting for reception power or amplitude may be identified (block 824A). An equalizer setting corresponding to the power or amplitude setting may be obtained (block 826A) and the corresponding maximum AC gain may be calculated (block 828A). The resulting AC gain identified may be logged (block 830A). If there are more power settings for a receiver circuitry to be analyzed (block 832A), the loop that may include blocks 824A, 826A, 828A, 830A, and 832A may be repeated until the maximum AC gains for all power settings of interest are calculated. Based on the logged maximum AC gains, an optimal power-aware link setting may be identified as the data communication link setting that provides the maximum AC gain. Note that the baseline link method 122A may also assist the operations represented by block 304A in method 118A of FIG. 6.

Figure 12:
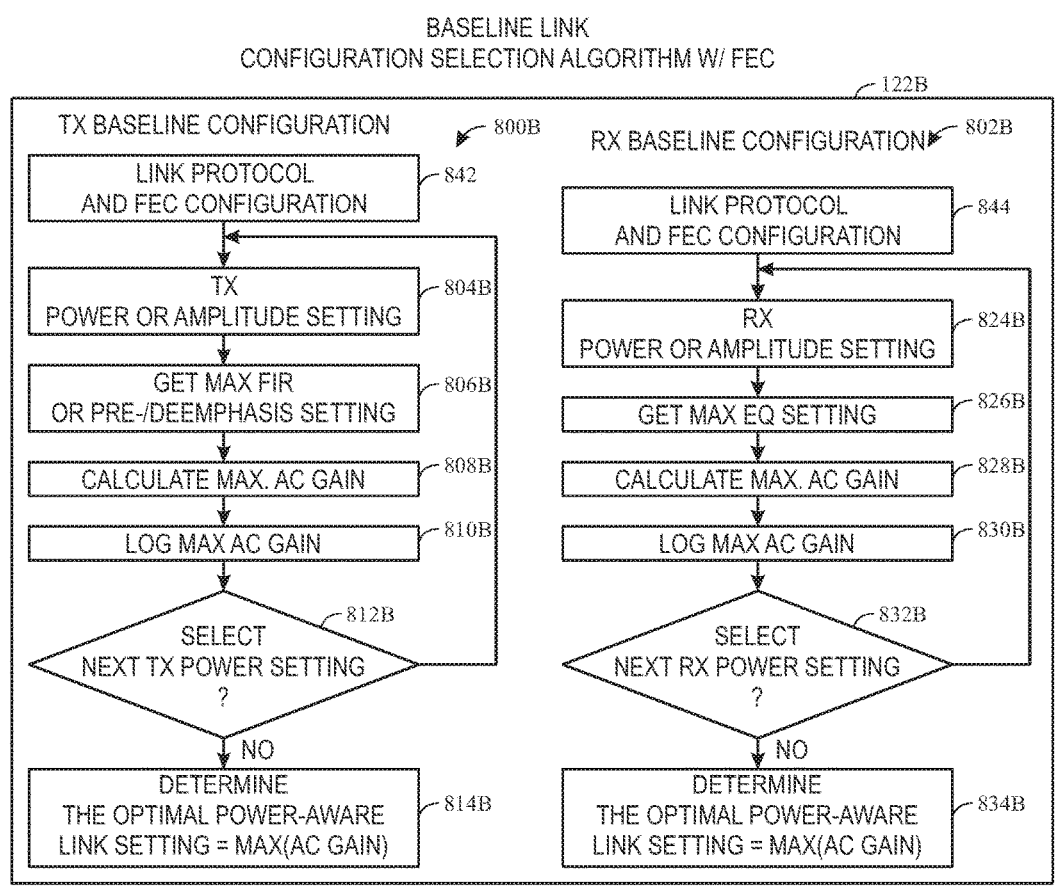
FIG. 12 is a flowchart of a method to select a baseline link configuration that may employ an FEC scheme, in accordance with an embodiment.

FIG. 12 illustrates a method 122B to identify a baseline configuration for a transmission and/or receiver circuitry that may assist a method to configure the device and data communication link, such as method 118B of FIG. 7. Note that method 122B may be similar to method 122A and the processes described in method 122A may be similar to corresponding process in method 122B, as identified by the use of a similar number. Note that in method 122B, the protocol employed in the data communication link and/or the FEC scheme configuration may play a role in determining the appropriate baseline configuration for the transmitter circuitry (block 842) and in the receiver circuitry (block 844). Note that the baseline link method 122B may also assist step 304B in method 118B of FIG. 7.

Figure 13:
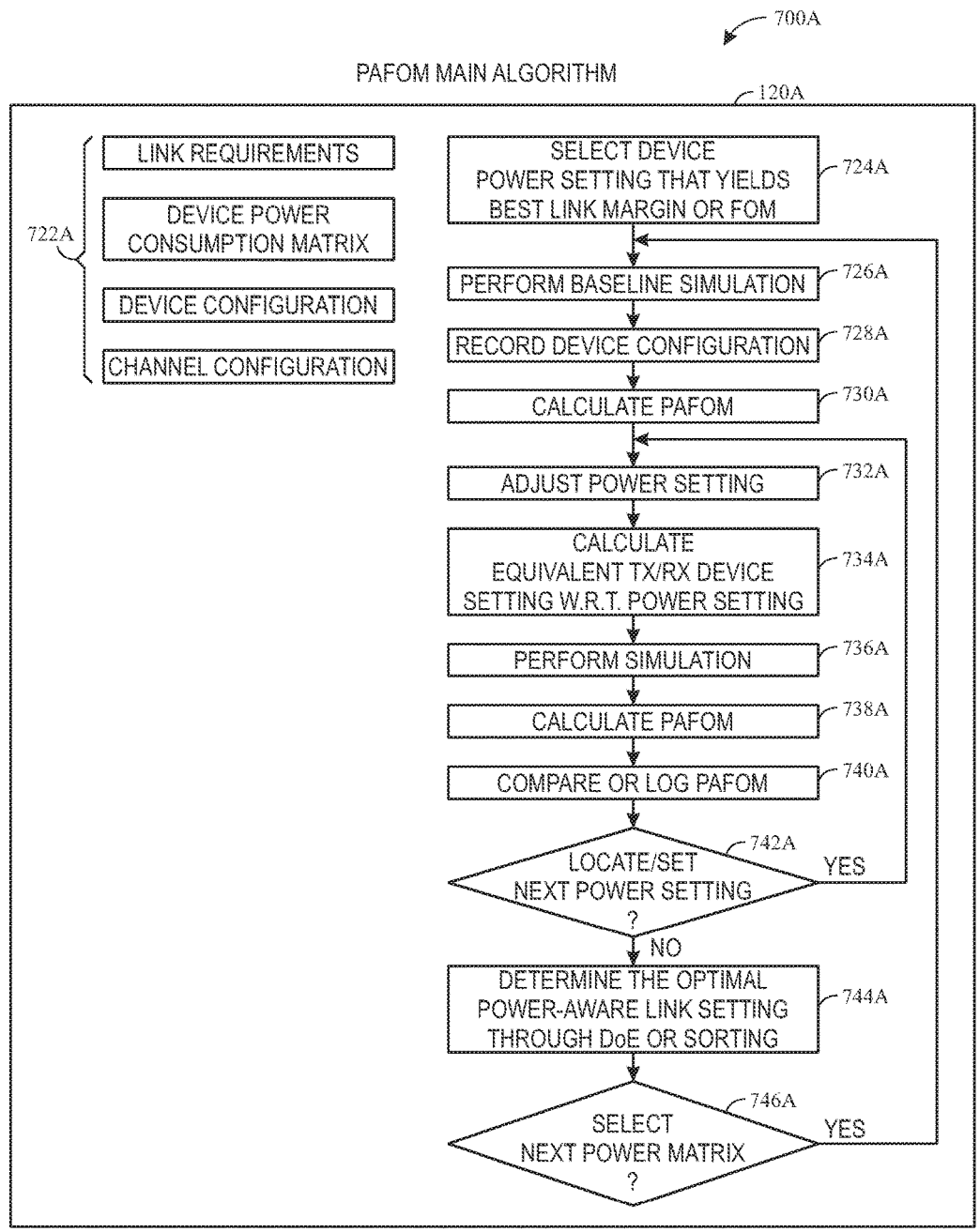
FIG. 13 is a flow chart of a method to calculate a power-aware figure of merit of a data communication link, and may assist the method of FIG. 3, in accordance with an embodiment.

Following the data communication link and device configuration processes described above, the method may proceed to calculate a power-aware figure of merit (PAFOM). During the block to determine link and device settings 106, a fine-tuning of the transmitter and receiver settings that may lead to a more efficient power usage may take place. Flow chart 700A of FIG. 13 illustrates an embodiment of a method 120A to calculate a PAFOM and to adjust settings to improve the power consumption characteristics of the system based on the calculated PAFOM. In some embodiments, the fine-tuning may take as constraints 722A the data communication link specifications, the power consumption matrix of the device, the configuration of the devices and the known channel configuration. In some embodiments, some or all of constraints 772A may have been identified during the block for link specification acquisition 102 or during the component to determine link configuration and device features 104.

To identify the PAFOM based on the constraints, the power settings of the device that yield the best link margin may be selected (block 724A). This selection may be based on results from a link protocol selection method (block 116) and/or a device/link configuration and selection method (block 118). With the device power setting configuration, the system performing method 120A may generate a baseline simulation (block 726A) and save the present device configuration (block 728A) for later reference. A calculation of a PAFOM is performed (block 730A). The PAFOM may be measured directly using on-die eye diagram monitors, and/or power meters. The PAFOM may also be calculated through simulations.

Power settings of the receiver and/or the sender may be adjusted (block 732A). Examples of settings may include a transmission output amplitude, the supplied voltage to the sender and/or receiver circuitry of the communicating electronic devices, the type of oscillator employed in the sender or receiver (semiconductor clocks, ring oscillators, LC tanks, PLL devices, etc.), features of the CDR system (loop filter configurator or power efficient oscillator, etc.). The changes in the power setting may be used to identify the device setting corresponding to the power setting (block 734A). Methods to identify the device setting are discussed below.

With the new device settings identified, a new simulation or measurement may be performed (block 736A) and a new PAFOM may be calculated (block 738A). The new PAFOM may be compared with the previously calculated PAFOM. In some embodiments, the PAFOM may be recorded along with a corresponding device configuration to generate a log of device settings and PAFOMs for later reference. Based on the simulations, PAFOMs and link margins identified, it may be of interest to identify a new power setting (block 724A). In some embodiments, a list of alternative power settings and/or device settings previously identified may be stored in a memory and available for the system implementing method 120A. The loop, which may include blocks 732A, 734A, 736A, 738A, 740A, and 742A, may be repeated until the PAFOM for all power settings of interest may be identified. In some embodiments, an identification of a power setting that leads to an acceptable PAFOM may be used to exit the loop at block 742A.

Upon exiting the above-described loop in block 742A, the better performing power-aware link setting may be chosen. In some embodiments, this decision may be made based on sorting of logged PAFOMs. In other embodiments, the decision may be made through design of experiments (DoE). If there are other power matrices in the device to be evaluated (block 746A), the data communication link is reconfigured based on the next power matrix, and power-efficient link settings may be identified through a loop that may include blocks 726A, 728A, 730A, 734A, 736A, 738A, 740A, 742A, 744A and 746A. If no further power matrices are available to be tested, a power efficient data communication link configuration that may include device power settings, preferred power matrix, channel configuration, enabled features, link protocol, and other data communication link characteristics may be provided.

Figure 14:
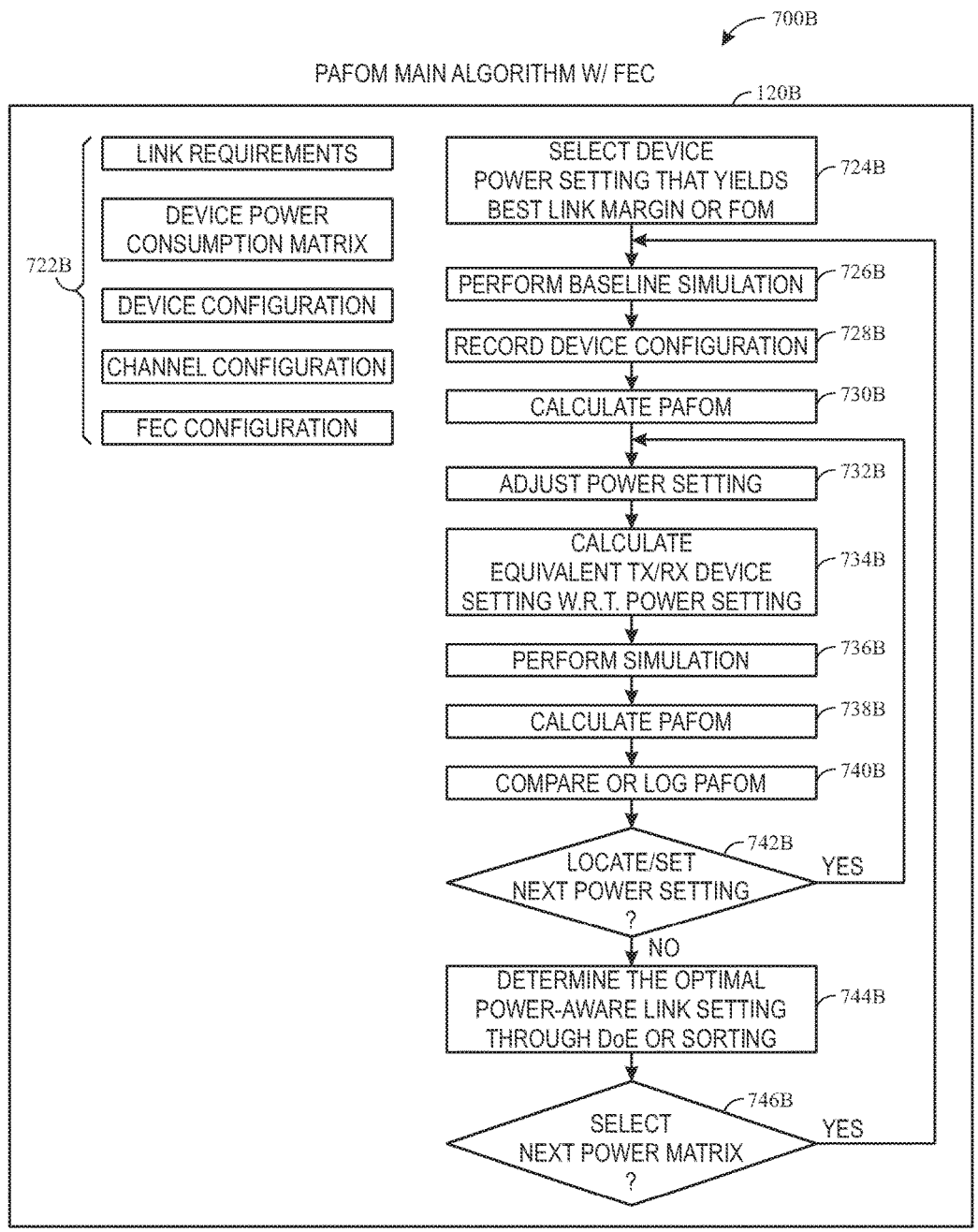
FIG. 14 is a flow chart of a method to calculate a power-aware figure of merit of a data communication link that may employ an FEC scheme, and may assist the method of FIG. 3, in accordance with an embodiment.

Note that in embodiments in which an FEC scheme may be used, a modification of method 120A may be applied. Flow chart 700B of FIG. 14 illustrates a method 120B to determine a PAFOM for data communication link configurations using an FEC scheme. Steps of method 120B may be similar to similarly numbered steps of method 120A. Note in particular, that the FEC scheme is included in constraints 722B. Further, in some embodiments, the algorithms that implement the methods above described may be performed in an external system or device that may control the data communication link configuration. In some use cases, a link configuration component (such as link configuration components 26 and 28 of FIG. 1) may perform methods 120A or 120B to identify a PAFOM and to fine-tune the transmitter and/or receiver settings.

Figure 15A:
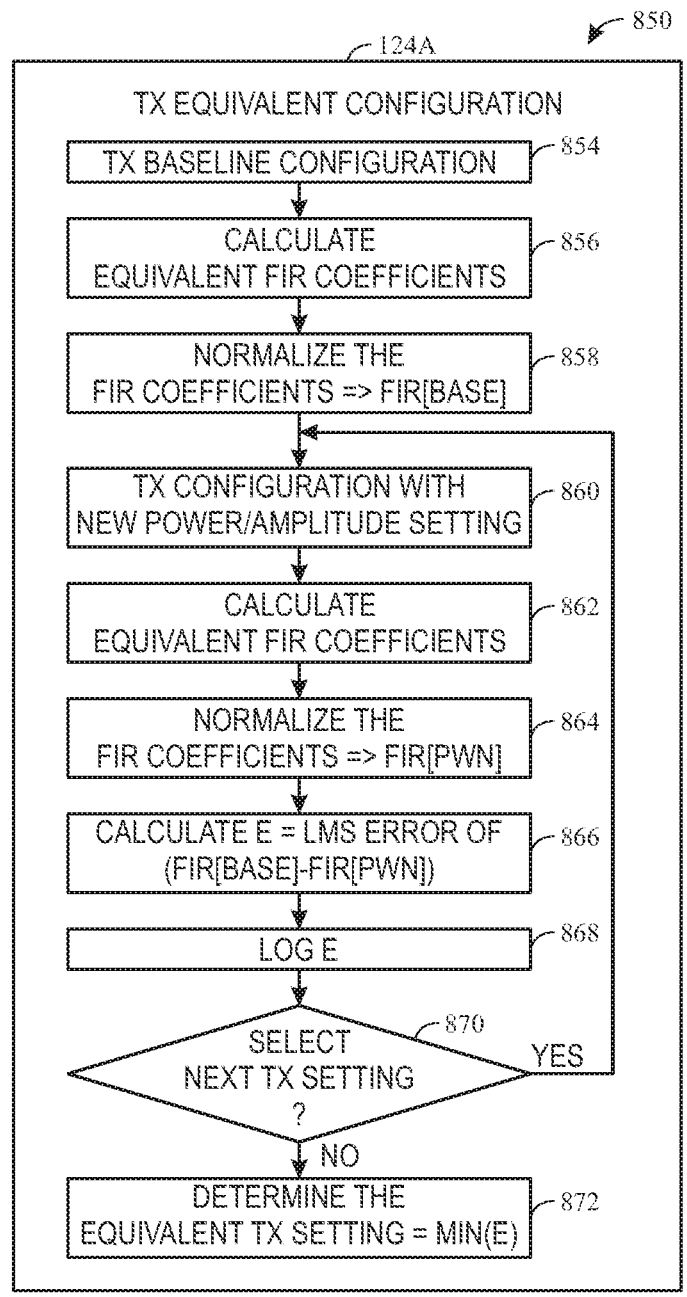
FIG. 15A is a flowchart of a method to select a sender equivalent configuration, in accordance with an embodiment.

As mentioned when discussing methods 120A and 120B to determine a PAFOM and adjust settings based on the calculated PAFOM, some processes may employ a step to calculate the setting of datalink components (transmitter circuitry and/or receiver circuitry) based on the power setting changes for the devices. A method 124A to configure a transmitter circuitry, illustrated by flow chart 850 of FIG. 15A, may be applied. In method 124A, an initial transmitter baseline configuration is obtained (block 854). Finite impulse response (FIR) coefficients corresponding to baseline configuration are calculated (block 856) and normalized (block 858).

A new transmitter setting configuration that may correspond to a power or amplitude setting is retrieved (block 860) and FIR coefficients corresponding to the new transmitter setting may be calculated (block 862) and normalized (block 864). An error may be calculated as the least mean square difference between the FIR coefficients of the baseline configuration and a new transmitter setting configuration (block 866), and the error may be logged. If there are other transmitter settings that correspond to the transmitter circuit configuration (block 870), a loop may include blocks 860, 862, 864, 866, 868, and 870 may be repeated until the error of all transmitter circuitry settings corresponding to a new power setting are calculated and logged. The transmitter circuitry setting that is associated with the smallest error calculated in the loop may be selected (block 872). This method provides an efficient way of identifying the equivalent TX settings without performing detail simulations or measurements.

Figure 15B:
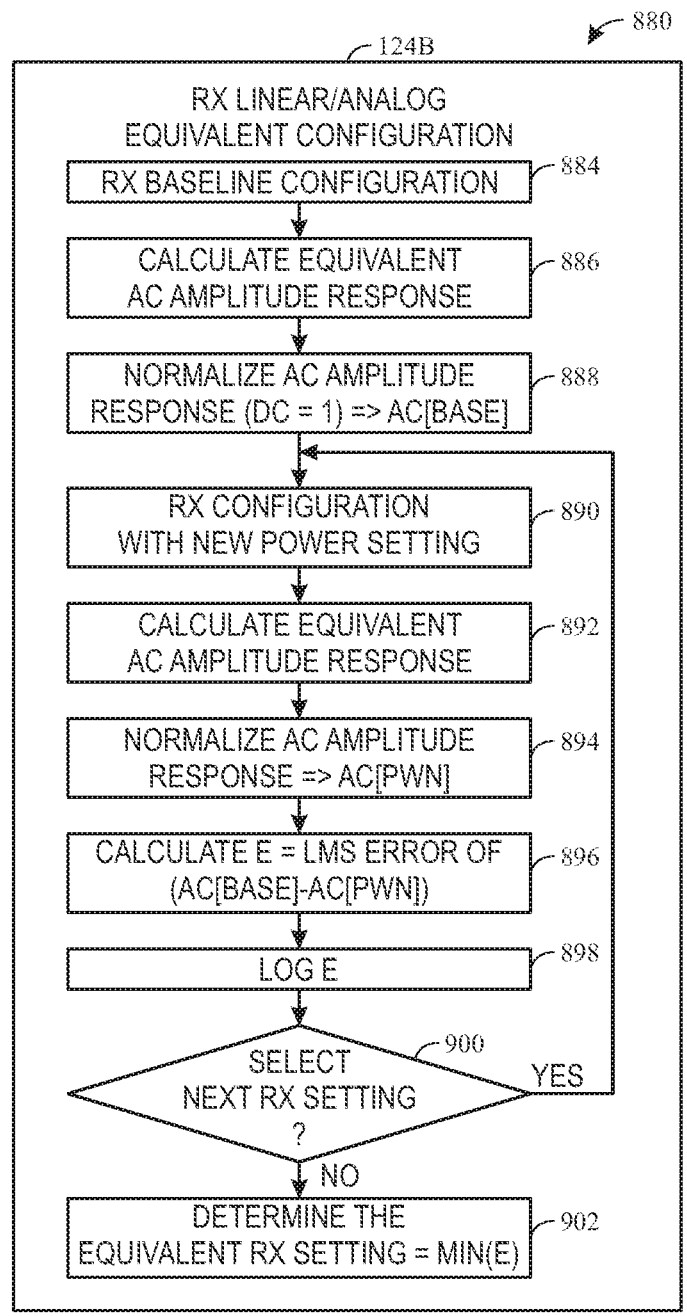
FIG. 15B is a flowchart of a method to select a receiver linear/analog equivalent configuration, in accordance with an embodiment.

Similarly, the method 124B to configure analog receiver circuitry, illustrated by flow chart 850 of FIG. 15B, may be applied. In method 124B, an initial receiver baseline configuration is obtained (block 884). An AC amplitude response corresponding to baseline configuration are calculated (block 886) and normalized (block 888). In some use cases the AC amplitude response may be normalize by setting the DC gain (i.e., the zero frequency gain) to be one. A new receiver setting configuration that may correspond to a power or amplitude setting is retrieved (block 890) and an equivalent AC amplitude response corresponding to the new receiver setting may be calculated (block 892) and normalized (block 894). An error may be calculated as the least mean square difference between the AC amplitude response of the baseline configuration and of the new receiver setting configuration (block 896), and the error may be logged. If there are other receiver settings that correspond to the receiver circuit configuration (block 900), a loop may include blocks 890, 892, 894, 896, 898, and 900 may be repeated until the error of all receiver circuitry settings corresponding to a new power setting are calculated and logged. The receiver circuitry setting that is associated with the smallest error calculated in the loop may be selected (block 902). This method provides an efficient way of identifying equivalent RX settings without performing detail simulations or measurements.

Figure 15C:
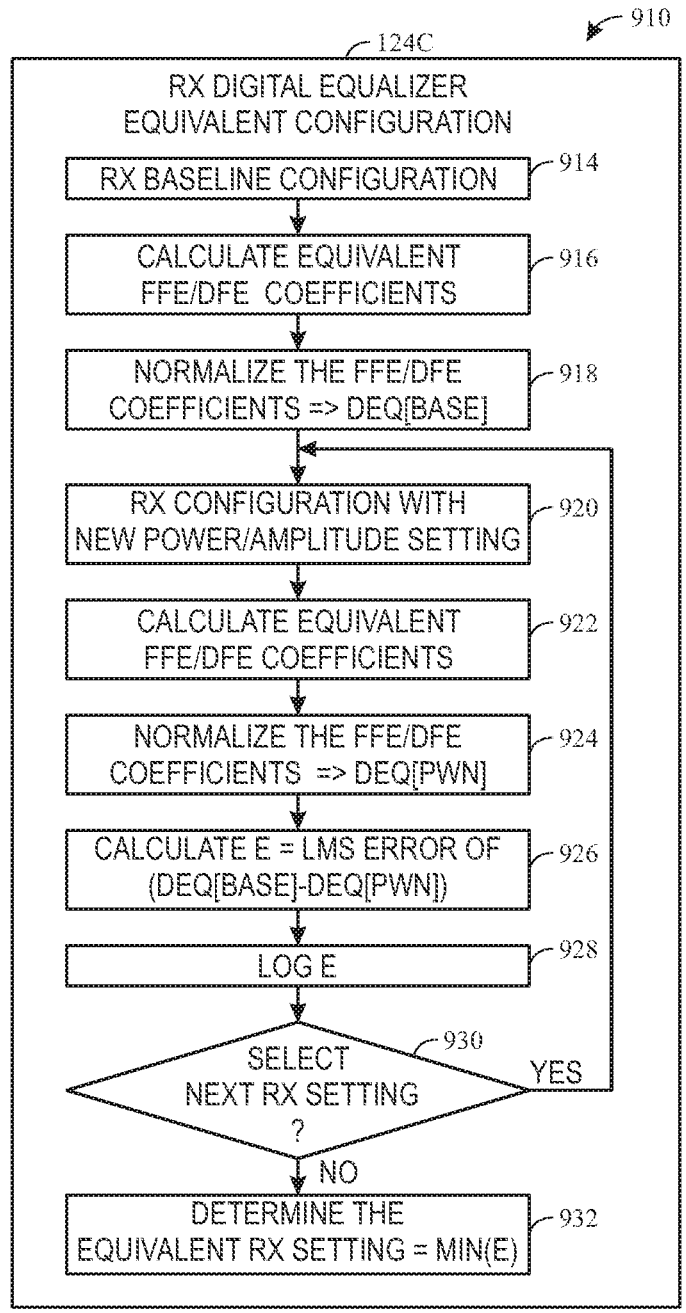
FIG. 15C is a flowchart of a method to select a receiver digital equalizer equivalent configuration, in accordance with an embodiment.

Adjustments to the power setting in the receiver circuitry may also be accommodated via adjusting the configuration of the receiver circuitry equalizer. An implementation of a method 124C that adjust the digital equalizer configuration of the receiver based on an adjustment to the power setting is illustrated in method flow chart 910 of FIG. 15C. In method 124C, an initial receiver baseline configuration is obtained (block 914). An FFE (feed forward equalizer)/DFE (decision feedback equalizer) coefficients corresponding to baseline configuration are calculated (block 916) and normalized (block 198) to obtain a baseline digital equalizer (DEQ). A new receiver setting configuration that may correspond to a power or amplitude setting is retrieved (block 920) and equivalent FFE/DFE coefficients corresponding to the new receiver settings may be calculated (block 922) and normalized (block 924) to obtain a new receiver DEQ. An error may be calculated as the least mean square difference between the baseline DEQ and the configuration and of the new receiver setting configuration (block 896), and the calculated error may be logged. If there are other receiver settings that correspond to the receiver circuit configuration (block 930), a loop may include blocks 920, 922, 924, 926, 928, and 930 may be repeated until the error of all receiver circuitry settings corresponding to a new power setting are calculated and logged. The receiver circuitry setting that is associated with the smallest error calculated in the loop may be selected (block 932). This method provides an efficient way of identify the equivalent RX DEQ settings without performing detailed simulations or measurements.

The above described systems and methods may allow design and use of power-efficient data communication links between electrical devices. In some embodiments, the power efficiency may be obtained through changes in the settings of the devices that compose the data communication link while the system and/or the data communication link is operational. These reconfigurations may be particularly useful in systems in which PLDs or FPGAs may be configured as part of receiver, transmitter, or channel circuitry.

What is claimed is:

1. A method to configure a data communication link comprising:
   acquiring, in a data communication link controller, a set of specifications for the data communication link between sender circuitry and receiver circuitry;
   selecting, in the data communication link controller, a data communication link protocol based on the set of specifications;
   selecting, in the data communication link controller, a set of sender parameters of the sender circuitry, a set of receiver parameters of the receiver circuitry and a set of channel parameters of a communication channel that communicatively couples the sender circuitry and the receiver circuitry, based on the data communication link protocol, the set of specifications, and a link operation target;
   calculating, in the data communication link controller, a power aware figure of merit for the data communication link based on a data communication link simulation using the set of sender parameters, the set of receiver parameters, and the set of channel parameters; and
   adjusting, by the data communication link controller, the set of sender parameters, the set of receiver parameters, and the set of channel parameters based on the power aware figure of merit for the data communication link.

2. The method of claim 1, wherein acquiring the set of specifications in the data communication link controller for the data communication link comprises acquiring a device power matrix, a bit error rate target, a response time constraint, a link topology, the data communication link protocol, or a forward error correction scheme, or any combination thereof.

3. The method of claim 2, wherein the link topology comprises an optical link.

4. The method of claim 1, wherein selecting the data communication link protocol in the data communication link controller comprises:
    selecting a link protocol specification, wherein the link protocol specification comprises a set of data rates; and
    selecting a slowest data rate of the link protocol specification that satisfies a response time specification for the data communication link.

5. The method of claim 1, wherein the link operation target comprises an assessment point matrix comprising a set of assessment points, and wherein selecting the set of sender parameters, the set of receiver parameters, and the set of channel parameters comprises:
    calculating an assessment point figure of merit of a set of assessment point figures of merit for each assessment point of the assessment point matrix, based on the link operation target; and
    determining a link margin as a largest positive assessment point figure of merit of the set of assessment point figures of merit.

6. The method of claim 5, wherein the assessment point matrix comprises a channel output without a clock-and-data recovery.

7. The method of claim 1, wherein selecting the set of sender parameters in the data communication link controller, the set of receiver parameters, and the set of channel parameters comprises:
    selecting a data communication link configuration comprising the set of sender parameters, the set of receiver parameters, and the set of channel parameters;
    determining a link margin of the data communication link configuration based on a simulation of the data communication link;
    determining the use of a repeater component in the data communication link channel based on the link margin of the data communication link configuration without the repeater component; and
    determining the use of a retimer component in the channel based on the link margin of the data communication link configuration without the retimer component and on the link margins of the data communication link configuration without neither the retimer component nor the repeater component.

8. The method of claim 7, wherein the repeater component comprises an electrical-optical-electrical (EOE) component without retimer and the retimer component comprises an EOE component with retimer.

9. The method of claim 1, wherein the receiver circuitry comprises an eye diagram monitor, and the data communication link simulation is performed in part by the eye diagram monitor.

10. The method of claim 1, wherein the receiver circuitry comprises clock and data recovery component.

11. The method of claim 1, wherein the sender circuitry comprises the data communication link controller, and the data communication link simulation is performed in the data communication link controller.

12. The method of claim 11, wherein the data communication link controller is implemented in a programmable logic device or a field programmable gate array.

13. The method of claim 1, wherein the sender circuitry is coupled to the communication channel through a transceiver of the first electrical device.

14. The method of claim 1, wherein adjusting the set of sender parameters by the data communication link controller comprises:
    calculating an initial set of finite impulse response (FIR) coefficients corresponding to an initial set of sender parameters;
    identifying a second set of sender parameters based on the power aware figure of merit;
    calculating a second set of FIR coefficients corresponding to a second set of sender parameters; and
    comparing the initial set of FIR coefficients and the second set of FIR coefficients.

15. The method of claim 1, wherein adjusting the set of receiver parameters by the data communication link controller comprises:
    calculating an initial alternate current (AC) amplitude response corresponding to an initial set of receiver parameters;
    identifying a second set of receiver parameters based on the power aware figure of merit;
    calculating a second AC amplitude response corresponding to the second set of receiver parameters; and
    comparing the initial AC amplitude response and the second AC amplitude response.

16. A dynamic data communication link comprising:
    a sender circuitry in a first electrical device;
    a receiver circuitry in a second electrical device;
    a communication channel that communicatively couples the sender circuitry and the receiver circuitry; and
    a data communication link controller device that comprises instructions to:
        acquire a set of specifications for the data communication link during an operation of the data communication link;
        select a data communication link protocol based on the set of specifications;
        select a set of parameters for the sender circuitry, the receiver circuitry, and the communication channel based on the set of specifications and a link operation target;
        calculate a power aware figure of merit for the data communication link based on a data communication link simulation using the set of parameters; and
        adjust the set of parameters based on the power aware figure of merit and the link operation target during an operation of the data communication link.

17. The dynamic data communication link of claim 16, wherein the set of parameters comprises an output amplitude of the sender circuitry, a supply voltage of the sender circuitry, a supply voltage of the receiver circuitry, a type of oscillator of the sender circuitry, a type of oscillator of the receiver circuitry, a protocol of the dynamic data communication link, a topology of the dynamic data communication link, or a scheme for forward error correction, or any combination thereof.

18. The dynamic data communication link of claim 16, wherein the data communication link controller device is disposed in the first electrical device.

19. A data communication link controller device that controls a data communication link comprising:
    a sender circuitry in a first electrical device and configured with a set of sender parameters;
    a receiver circuitry in a second electrical device and configured with a set of receiver parameters; and
    a communication channel that communicatively couples the sender circuitry and the receiver circuitry, the communication channel configured with a set of channel parameters,
    wherein the data communication link controller device comprises instructions to:

acquire a set of specifications for the data communication link;
select a data communication link protocol based on the set of specifications;
select the set of sender parameters, the set of receiver parameters and the set of channel parameters based on the data communication link protocol, the set of specifications, and a link operation target;
calculate a power aware figure of merit for the data communication link based on a data communication link simulation using the set of sender parameters, the set of receiver parameters, and the set of channel parameters; and
adjust the set of sender parameters, the set of receiver parameters, and the set of channel parameters based on the power aware figure of merit for the data communication link.

20. The data communication link controller device of claim 19, wherein the data communication link controller device comprises logic circuitry programmed in a programmable logic device.

* * * * *